United States Patent
Saito et al.

(10) Patent No.: US 10,562,305 B2
(45) Date of Patent: Feb. 18, 2020

(54) INK JET RECORDING METHOD AND INK JET RECORDING APPARATUS

(71) Applicant: CANON KABUSHIKI KAISHA, Tokyo (JP)

(72) Inventors: Takashi Saito, Zushi (JP); Kouhei Nakagawa, Tokyo (JP); Arihiro Saito, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/028,512

(22) Filed: Jul. 6, 2018

(65) Prior Publication Data

US 2019/0009545 A1  Jan. 10, 2019

(30) Foreign Application Priority Data

Jul. 7, 2017 (JP) ................................ 2017-133626
Jun. 13, 2018 (JP) ................................ 2018-112737

(51) Int. Cl.

| B41J 2/155 | (2006.01) |
| C09D 11/322 | (2014.01) |
| C09D 11/38 | (2014.01) |
| B41J 2/14 | (2006.01) |

(52) U.S. Cl.
CPC ................ B41J 2/155 (2013.01); B41J 2/14 (2013.01); C09D 11/322 (2013.01); C09D 11/38 (2013.01); B41J 2202/11 (2013.01); B41J 2202/12 (2013.01)

(58) Field of Classification Search
CPC ....... C09D 11/40; C09D 11/322; C09D 11/54; B41J 2/2107

USPC ............................................ 347/47, 95, 100
See application file for complete search history.

(56) References Cited

U.S. PATENT DOCUMENTS

| 7,128,406 B2 | 10/2006 | Dixon et al. |
| 9,388,322 B2 | 7/2016 | Kakikawa et al. |
| 9,895,901 B2 | 2/2018 | Saito et al. |
| 2002/0118256 A1 | 8/2002 | Dixon et al. |
| 2016/0176192 A1* | 6/2016 | Fukumoto ............... B41J 2/1628 347/44 |
| 2016/0215152 A1* | 7/2016 | Yamamoto ........... C09D 11/107 |
| 2018/0134907 A1 | 5/2018 | Saito et al. |

FOREIGN PATENT DOCUMENTS

| JP | 2007-118611 A | 5/2007 |
| JP | 2011-132536 A | 7/2011 |

* cited by examiner

*Primary Examiner* — An H Do
(74) *Attorney, Agent, or Firm* — Venable LLP

(57) ABSTRACT

An object of the present invention is to provide an ink jet recording method capable of recording a high-quality image in which occurrence of unevenness is decreased. The ink jet recording method is a method of recording an image by ejecting ink from a recording head including an ejection orifice ejecting the ink, an ejection element generating energy for ejecting the ink, and first and second flow paths which communicate between the ejection orifice and the ejection element and in which the ink flows. The ink jet recording method includes: an ejection step of ejecting the ink from the ejection orifice; and a flow step of flowing the ink in the first flow path to the second flow path separately from the ejection step, wherein the ink is aqueous ink containing a pigment and a specific compound having an ethylene oxide group.

20 Claims, 8 Drawing Sheets

FIG. 7A
FIG. 7B
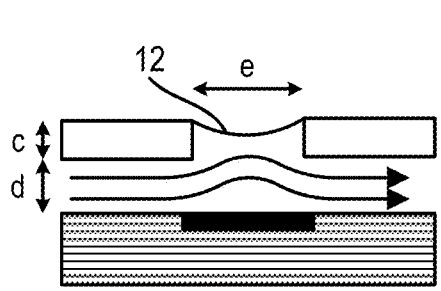
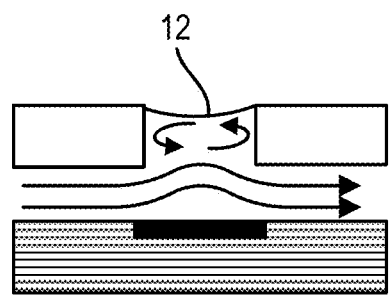

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

Recently, ink jet recording apparatuses are increasingly used in office printing and commercial printing fields. Further, in the ink jet recording apparatus, there is a need to further increase a recording speed. In order to increase the recording speed, an ink jet recording method of recording an image in single pass by using a line type recording head (line head) is advantageous as compared to a multi-pass recording method performed using a serial type recording head according to the related art.

However, due to a configuration of the apparatus, the line head has a feature that it is difficult to perform a recovery operation from a nozzle in which ejection from a nozzle is paused or from a nozzle with a low ejection frequency. Particularly, even though there are nozzles with a low ejection frequency, it may be difficult to perform a preliminary ejection operation for preventing deterioration of ejection performance due to thickening of ink.

Meanwhile, in the case of recording an image in single pass by using the line head, since a difference in ejection volume between nozzles easily affects the image quality, there is a need to further improve the ejection stability of ink. For example, a recording head having a mechanism for flowing ink in the vicinity of an ejection orifice in order to suppress foreign materials from remaining in the nozzle has been suggested (Japanese Patent Application Laid-Open No. 2007-118611). Further, a method of ejecting ink which contains a thickening agent and the like, and of which a decrease in viscosity is suppressed at a high shear rate from a recording head including a mechanism circulating the ink has been suggested (Japanese Patent Application Laid-Open No. 2011-132536).

SUMMARY OF THE INVENTION

The present inventors investigated a case of recording an image in single pass using a line head adopting a mechanism for flowing ink in the vicinity of an ejection orifice, suggested in Japanese Patent Application Laid-Open No. 2007-118611, in order to further increase a recording speed. As a result, it could be appreciated that ejection stability of the ink can be improved. However, it was found that even in the case of using the line head adopting the mechanism suggested in Japanese Patent Application Laid-Open No. 2007-118611, when an image is recorded by ejecting ink over a long period of time, a new problem that streaky unevenness may occur in the image occurs. Further, with the configuration suggested in Japanese Patent Application Laid-Open No. 2011-132536, non-uniform ejection can be decreased and intermittent ejection stability can be improved by adjusting a viscosity or circulating ink, but in the case of recording an image by ejecting ink over a long period of time, it was found that streaky unevenness occurred in the image.

An object of the present invention is to provide an ink jet recording method capable of recording a high-quality image in which occurrence of unevenness is decreased. Another object of the present invention is to provide an ink jet recording apparatus used in the ink jet recording method described above.

That is, according to the present invention, there is provided an ink jet recording method of recording an image by ejecting ink from a recording head including an ejection orifice ejecting the ink, an ejection element generating energy for ejecting the ink, and first and second flow paths which communicate between the ejection orifice and the ejection element and in which the ink flows, the ink jet recording method including: an ejection step of ejecting the ink from the ejection orifice; and a flow step of flowing the ink in the first flow path to the second flow path separately from the ejection step, wherein the ink is aqueous ink containing a pigment and a compound having an ethylene oxide group, and the compound having an ethylene oxide group is at least one selected from the group consisting of the following compound A, compound B and compound C:

compound A: polyhydric alcohol derivative in which X mole(s) of ethylene oxide group(s) and Y mole(s) of propylene oxide group(s) are added to a polyhydric alcohol having three or more hydroxy groups and a proportion of $\{X/(X+Y)\} \times 100(\%)$ is 5% or more to 45% or less compound B: polyethylene glycol having a number average molecular weight of 600 or more to 4,000 or less (provided, a content (% by mass) of the compound B in the ink is 0.10 times or more as a mass ratio with respect to a content (% by mass) of the pigment), and compound C: polyoxyethylene alkyl ether having a hydrocarbon group in which the number of carbon atoms is 12 or more.

According to the present invention, an ink jet recording method capable of recording a high-quality image in which occurrence of unevenness is decreased can be provided. Further, according to the present invention, the ink jet recording apparatus used in the ink jet recording method described above can be provided.

Further features of the present invention will become apparent from the following description of exemplary embodiments with reference to the attached drawings.

BRIEF DESCRIPTION OF THE DRAWINGS

FIGS. 7A and 7B are schematic views for explaining a flow state of the ink in the vicinity of an ejection orifice.

DESCRIPTION OF THE EMBODIMENTS

Figure 1:
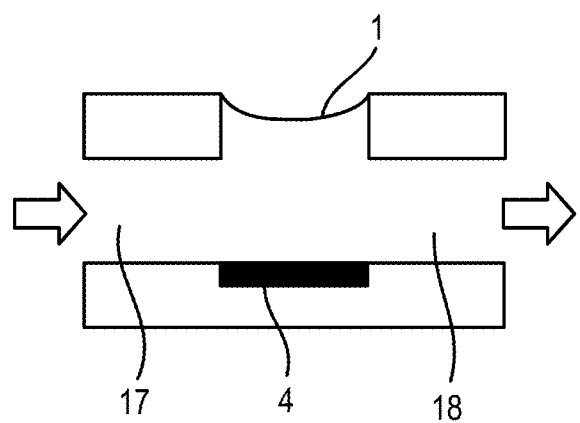
FIG. 1 is a schematic view illustrating an example of a recording head.

Hereinafter, the present invention will be described in detail with reference to preferred embodiments thereof. In the present invention, when a compound is a salt, in the ink, the salt is dissociated into ions, but for convenience, this ink is expressed as "containing a salt". Aqueous ink for ink jet is also simply referred to as "ink". The first and second flow paths are also collectively referred to as "flow paths". Unless otherwise described, physical properties values are values at room temperature (25° C.).

<Ink Jet Recording Method and Ink Jet Recording Apparatus>

An ink jet recording apparatus according to the present invention includes a recording head including an ejection orifice ejecting the ink, an ejection element generating energy for ejecting the ink, and first and second flow paths which communicate between the ejection orifice and the ejection element and in which the ink flows. Further, the ink jet recording apparatus according to the present invention includes a flowing unit flowing the ink in the first flow path to the second flow path separately from the ejection element. Further, the ink jet recording method according to the present invention is, for example, a method of recording an image by ejecting ink from the recording head using the ink jet recording apparatus described above. That is, the ink jet recording method according to the present invention includes an ejection step of ejecting the ink from the ejection orifice, and a flow step of flowing the ink in the first flow path to the second flow path, separately from the ejection step.

While the ink is not ejected, water is evaporated from an ejection orifice having a low ejection frequency of ink, such that the ink is thickened. This is one of the factors deteriorating ejection stability of the ink. As compared to a conventional recording head such as a serial head, since it is difficult to perform a preliminary ejection operation corresponding to a recovery step of the ejection orifice in a line head, there is a need to devise a method of suppressing water from being evaporated from the ejection orifice. Therefore, the present inventors investigated a line head adopting a flow mechanism suggested in Japanese Patent Application Laid-Open No. 2007-118611 or ink and a circulation mechanism suggested in Japanese Patent Application Laid-Open No. 2011-132536. As a result, ejection stability of the ink was improved as compared to the case in which ink did not flow, but the level could not be said to be sufficient. In the case of flowing the ink as suggested in Japanese Patent Application Laid-Open Nos. 2007-118611 and 2011-132536, since new ink is continuously supplied to the vicinity of the ejection orifice, water is easy to evaporate from the ejection orifice. As a result, it is presumed that the ink in the vicinity of the ejection orifice is easily thickened, such that ejection stability of the ink is not improved as much.

The present inventors investigated in detail a method of suppressing the thickening of the ink in the vicinity of the ejection orifice. As a result, it could be appreciated that it is possible to effectively suppress the thickening and evaporation of the ink in the vicinity of the ejection orifice by using a recording head in which a flow of ink (hereinafter, referred to as a "circulation flow") is generated as illustrated in FIG. 1, and thus it is possible to improve ejection stability of the ink.

FIG. 1 is a schematic view illustrating an example of a recording head. The recording head illustrated in FIG. 1 includes an ejection orifice 1 ejecting ink, an ejection element 4 generating energy for ejecting the ink, and first and second flow paths 17 and 18 which communicate between the ejection orifice 1 and the ejection element 4 and in which the ink flows. The ink flows from the first flow path 17 to the second flow path 18 (in an arrow direction in FIG. 1) while passing between the ejection orifice 1 and the ejection element 4. When the ink is not flowing, evaporation of water from a meniscus of the ejection orifice 1 proceeds, and thus the ink existing between the ejection orifice 1 and the ejection element 4 is slowly thickened. For this reason, when an ejection pause time is long, at the time of performing a next ejection operation, fluid resistance of the ink increases, and thus it may be difficult to eject the ink. On the contrary, when the ink is flowing in the arrow direction in FIG. 1, even in the case in which water is evaporated from the meniscus, since the ink is continuously supplied between the ejection orifice 1 and the ejection element 4 due to a circulation flow, thickening of the ink is suppressed and it is difficult to generate a state in which ejection is difficult.

Next, the present inventors recorded an image by ejecting the ink from an ejection orifice of a line head generating the circulation flow as illustrated in FIG. 1 over a long period of time. As a result, it could be appreciated that there was a new problem in that as the number of recorded sheets increased, unevenness occurred in the image. The reason why unevenness occurred in the image was investigated in detail, and it was found that the following phenomenon occurred.

Figure 2A:
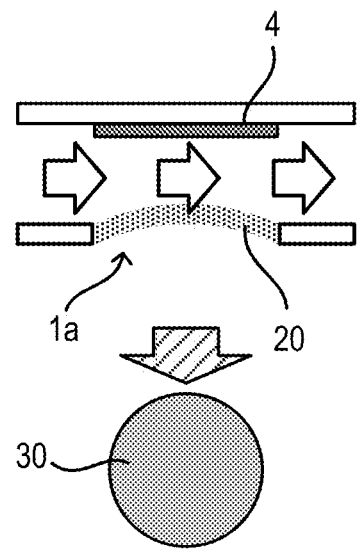
FIGS. 2A, 2B, 2C, and 2D are schematic views for explaining a flow state of ink in the recording head.
Figure 2C:
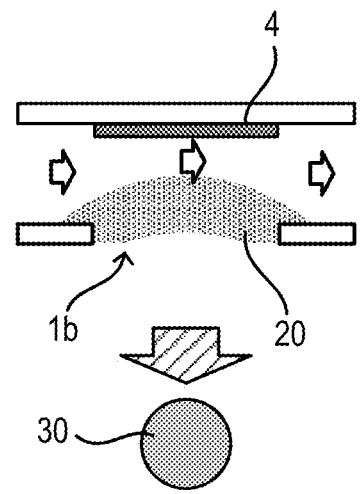

FIGS. 2A to 2D are schematic views for explaining a flow state of the ink in the recording head. As a result of measuring an ejection volume of ink from ejection orifices of the recording head which ejected ink over a long period of time, as illustrated in FIGS. 2A and 2C, it could be appreciated that there were an ejection orifice 1a in which the ejection volume was hardly changed and an ejection orifice 1b in which the ejection volume was changed. Further, a portion in which unevenness occurred in the image was coincident with the ejection orifice 1b in which the ejection volume was changed. From this result, it turned out that a difference in diameter between ink dots 30 formed on a recording medium occurred due to a difference in ejection volume of the ink in each of the ejection orifices 1a and 1b, and this difference was recognized as image unevenness.

Therefore, the present inventors investigated factors causing a change in the ejection volume of ink in each of the ejection orifices. As a result, it could be appreciated that the cause of change was a decrease in ejection volume as compared to other ejection orifices. Further, it could be appreciated that in the ejection orifice in which the ejection volume was changed, a temperature of the ink in the vicinity of the ejection orifice was decreased as compared to a temperature of the ink in the vicinity of other ejection orifices or an ink supply port or ink collect port in the vicinity of the ejection orifice is partially clogged by foreign materials. Therefore, it is presumed that the ejection volume was changed due to a minute difference in degrees of evaporation and thickening of the ink existing in the vicinity of ejection orifices between an ejection orifice in which a speed of the circulation flow has decreased and an ejection orifice in which the speed of the circulation flow has not decreased, and thus image unevenness occurred.

The present inventors investigated a method of suppressing occurrence of image unevenness even in the case in which there was a difference in speed of a circulation flow in each of the ejection orifices by ejecting the ink over a long period of time. More specifically, the present inventors investigated a case of allowing a viscosity of the ink existing in the vicinity of ejection orifices to be maintained constant regardless of the speed of the circulation flow in order to decrease the difference in the ejection volume of the ink in each of the ejection orifices due to a change in speed of the circulation flow. As a result, it was found that even after there is a difference in the speed of the circulation flow, the difference in the ejection volume of the ink in each of the ejection orifices can be suppressed by allowing a specific compound having an ethylene oxide group (to be described in detail below) to be contained in the ink. The present inventors infer the reason why this effect is obtained as follows.

Figure 2B:
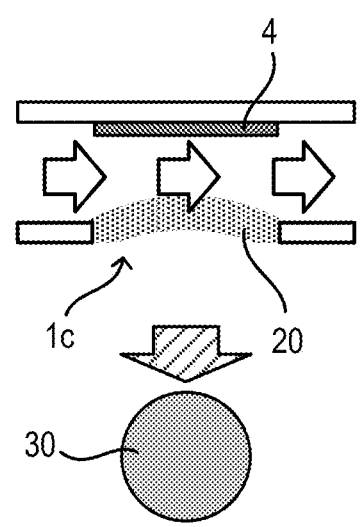
Figure 2D:
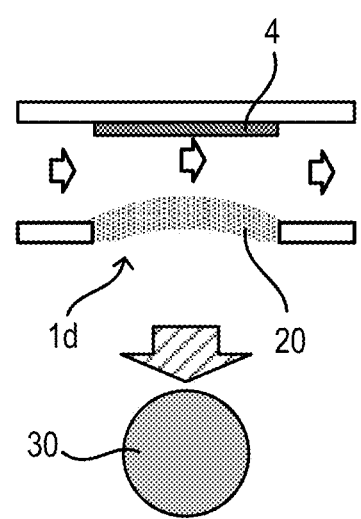

The recording head generating the circulation flow allows a portion of the ink in the vicinity of the ejection orifice to continuously flow from a first flow path (ink supply port) to a second flow path (ink collect port), thereby maintaining a viscosity of the ink in the vicinity of the ejection orifice constant. When the speed of the circulation flow is decreased, as illustrated in FIG. 2C, an amount of the ink flowing to the ink collect port is decreased, such that the ink stagnates in the vicinity of the ejection orifice 1b and is repeatedly evaporated and concentrated to thereby be thickened. That is, when the speed of the circulation flow is different in each of the ejection orifices, there is a difference in viscosity of the ink in the vicinity of the ejection orifices, such that there is a difference in ejection volume. The specific compound having an ethylene oxide group easily holds water due to a molecular structure thereof. Even in the case in which the ink easily stagnates in the vicinity of the ejection orifice, when the specific compound having an ethylene oxide group is present, it is possible to collect water from a portion in which the ink flows to the vicinity of the ejection orifice. When the speed of the circulation flow is decreased, an evaporation amount of water from the ejection orifice is increased, but it is possible to continuously collect water corresponding to the evaporation amount from the portion in which the ink flows. For this reason, even in the case in which there is a difference in speed of the circulation flow as illustrated in FIGS. 2B and 2D, the viscosity of the ink in the vicinity of the ejection orifices 1c and 1d can be controlled within a predetermined range, such that an ink layer 20 that is hardly affected by the speed of the circulation flow is formed. Therefore, it is thought that the change in ejection volume of the ink in each of the ejection orifices can be suppressed, and non-uniformity of diameters of ink dots 30 formed on the recording medium was solved, thereby making it possible to suppress occurrence of image unevenness.

Figure 3:
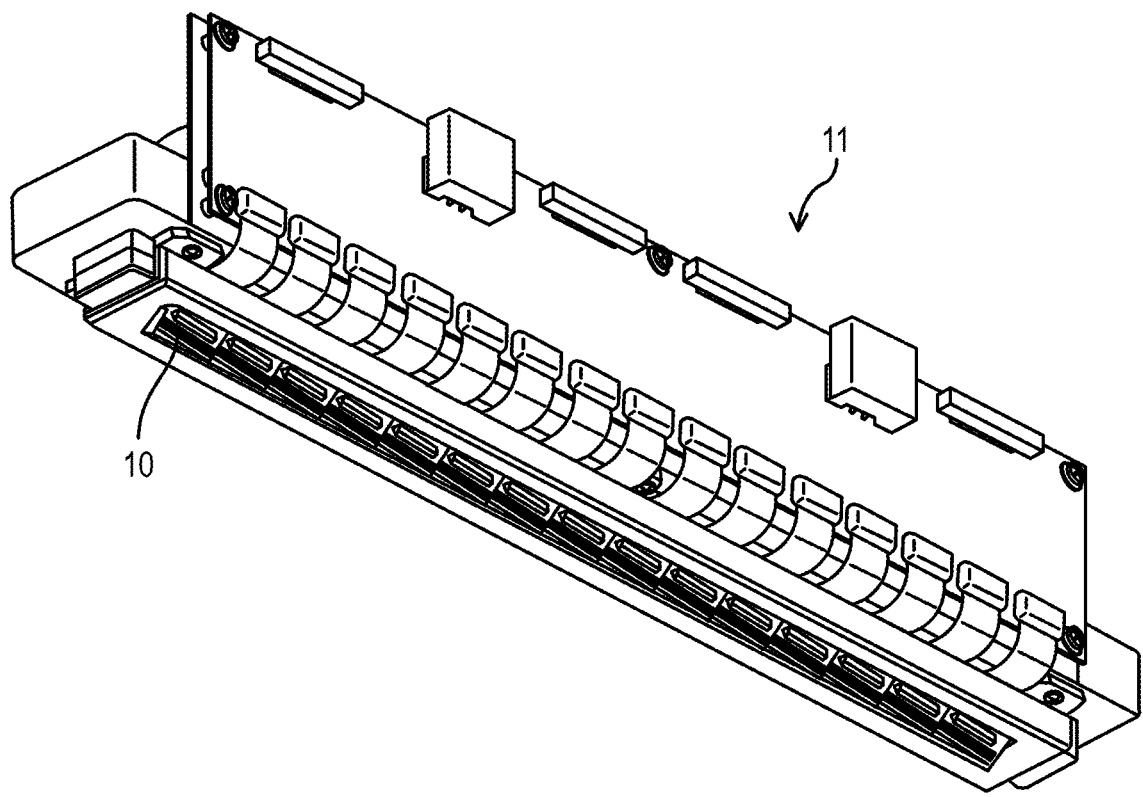
FIG. 3 is a perspective view illustrating an example of a line head.

FIG. 3 is a perspective view illustrating an example of a line head. As illustrated in FIG. 3, an ejection element substrate 10 in which ejection orifice arrays are disposed is arranged in a linear shape in the line head 11. In the ejection element substrate 10, for example, ejection orifice arrays corresponding to respective inks such as cyan, magenta, yellow and black (CMYK) inks are arranged.

Figure 4:
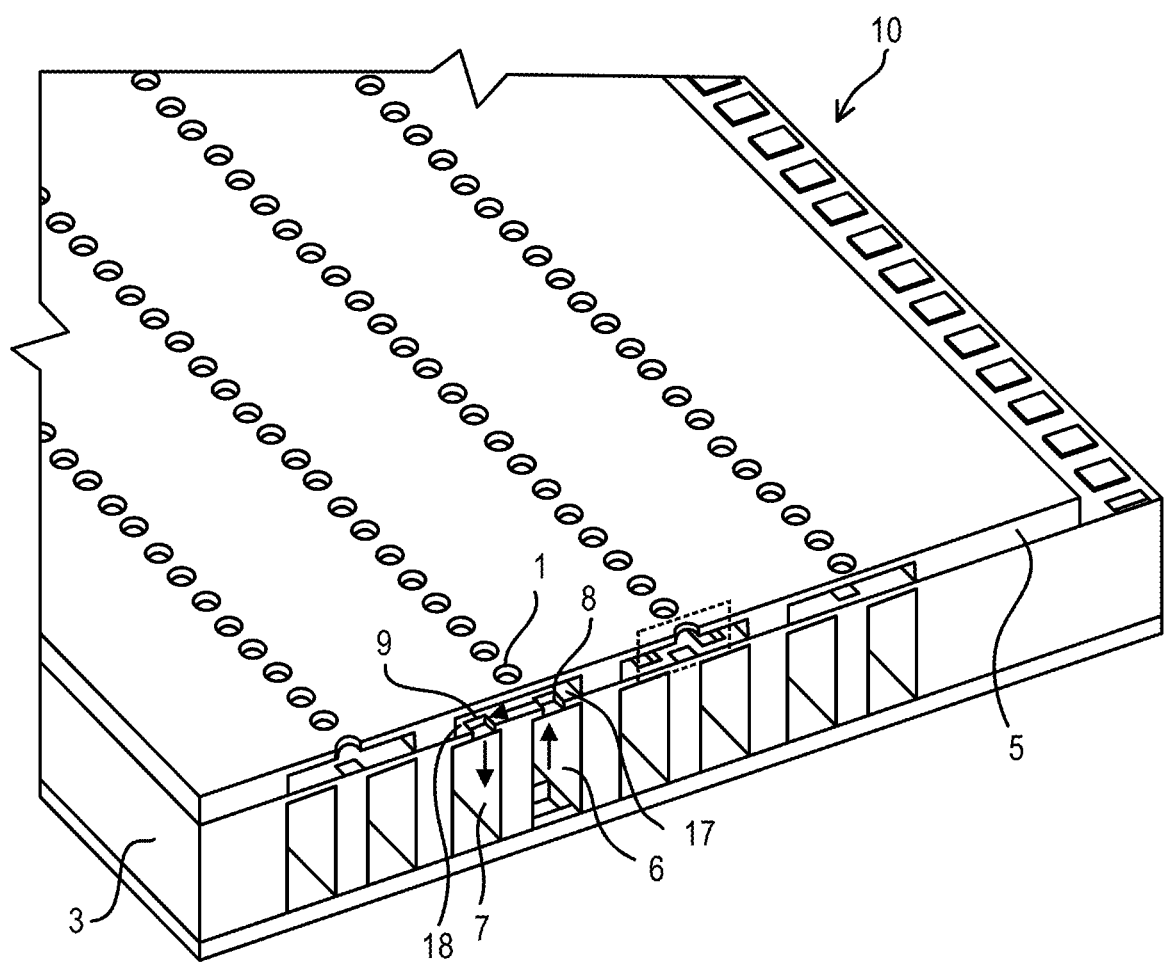
FIG. 4 is a perspective view illustrating a cross section of an ejection element substrate.

FIG. 4 is a perspective view illustrating a cross section of the ejection element substrate. As illustrated in FIG. 4, the ejection element substrate 10 includes an ejection orifice formation member 5 in which the ejection orifice 1 is formed and a substrate 3 in which the ejection element (not illustrated) is disposed. The ejection orifice formation member 5 and the substrate 3 are stacked, such that the first and second flow paths 17 and 18 in which the ink flows are formed. The first flow path 17 is a region from an inlet 8 through which the ink in an inlet path 6 is introduced to a portion between the ejection orifice 1 and the ejection element. Further, the second flow path 18 is a region from the portion between the ejection orifice 1 and the ejection element to an outlet 9 through which the ink is discharged to an outlet path 7. For example, when there is a difference in pressure between the inlet 8 and the outlet 9 such as an inlet 8 having a high pressure and an outlet 9 having a low pressure, the ink can flow from a portion at which the pressure is high to a portion at which the pressure is low (in an arrow direction in FIG. 4). The ink that passed through the inlet path 6 and the inlet 8 goes into the first flow path 17. In addition, the ink that passed through the portion between the ejection orifice 1 and the ejection element flows to the outlet path 7 through the second flow path 18 and the outlet 9.

The flow step of flowing the ink in the first flow path to the second flow path is a separate (different) step from the ejection step of ejecting the ink from the ejection orifice. Further, it is preferable that a flow of the ink from the first flow path to the second flow path in the flow step is performed separately from filling of the ink between the ejection orifice and the ejection element. It is preferable that the flow step is a step of flowing the ink in the first flow path to the second flow path without discharging the ink from the ejection orifice. Discharge of the ink from the ejection orifice includes recovery operations such as preliminary ejection or suction. During a recovery action of the recording head, a flow of the ink from the first flow path to the second flow path may be stopped. Further, in the flow step, it is preferable to flow the ink from the first flow path to the second flow path by a flowing unit separately from the ejection element.

Hereinafter, a case of using a thermal type recording head generating bubbles to eject ink using an ejection element generating thermal energy will be described by way of example in order to describe the ink jet recording method and the ink jet recording apparatus according to the present invention in more detail. However, a piezo type recording head, or a recording head adopting another ejection method can also be applied to the ink jet recording method and the ink jet recording apparatus according to the present invention. Hereinafter, a case in which the ink is circulated between an ink storage portion and the recording head is described by way of example, but another case may also be applied. For example, two ink storage portions may be provided on upstream and downstream sides of the recording head, and ink may flow from one ink storage portion to another ink storage portion. Further, a line head in which the ejection element substrate capable of ejecting four color inks (CMYK) is linearly arranged will be described by way of example, but a line head in which ejection element substrates corresponding to four color inks, respectively, are provided can also be used. In addition, as a recording head other than the line head, a serial head recording an image while scanning can also be used. In the present invention, it is particularly preferable to use the line head ejecting ink in a thermal method.

Figure 5:
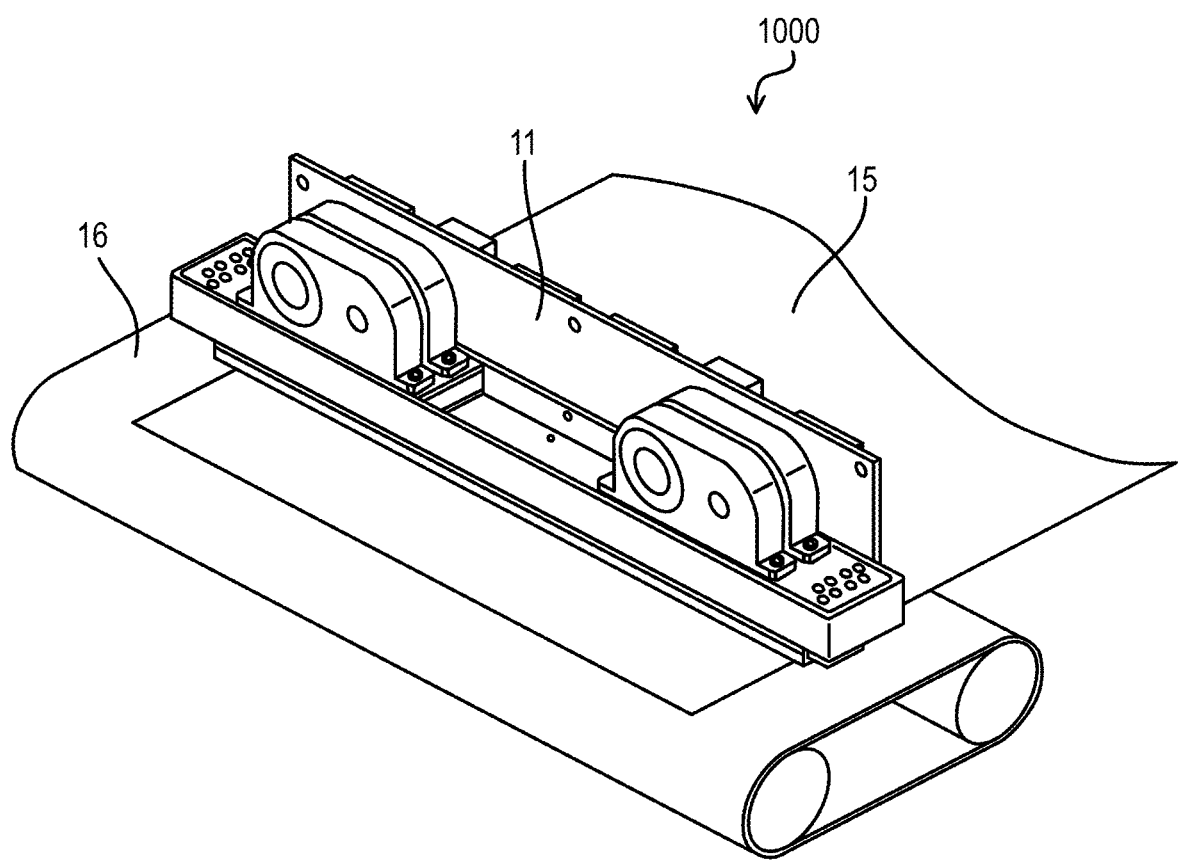
FIG. 5 is a perspective view illustrating main portions of an ink jet recording apparatus.

FIG. 5 is a perspective view illustrating main portions of an ink jet recording apparatus. An ink jet recording apparatus 1000 illustrated in FIG. 5 includes a conveyance portion 16 conveying a recording medium 15 and a line head 11 disposed to be orthogonal to a conveyance direction of the recording medium. The ink jet recording apparatus 1000 includes a line head 11 recording an image while continuously or intermittently conveying a plurality of recording media 15. As the recording medium 15, roll paper as well as cut paper can also be used. As the recording medium, any recording medium may be used. Among them, paper having permeability, for example, a recording medium having no coating layer such as plain paper or non-coated paper and a recording medium having a coating layer such as a glossy paper or an art paper is preferably used.

Figure 6:
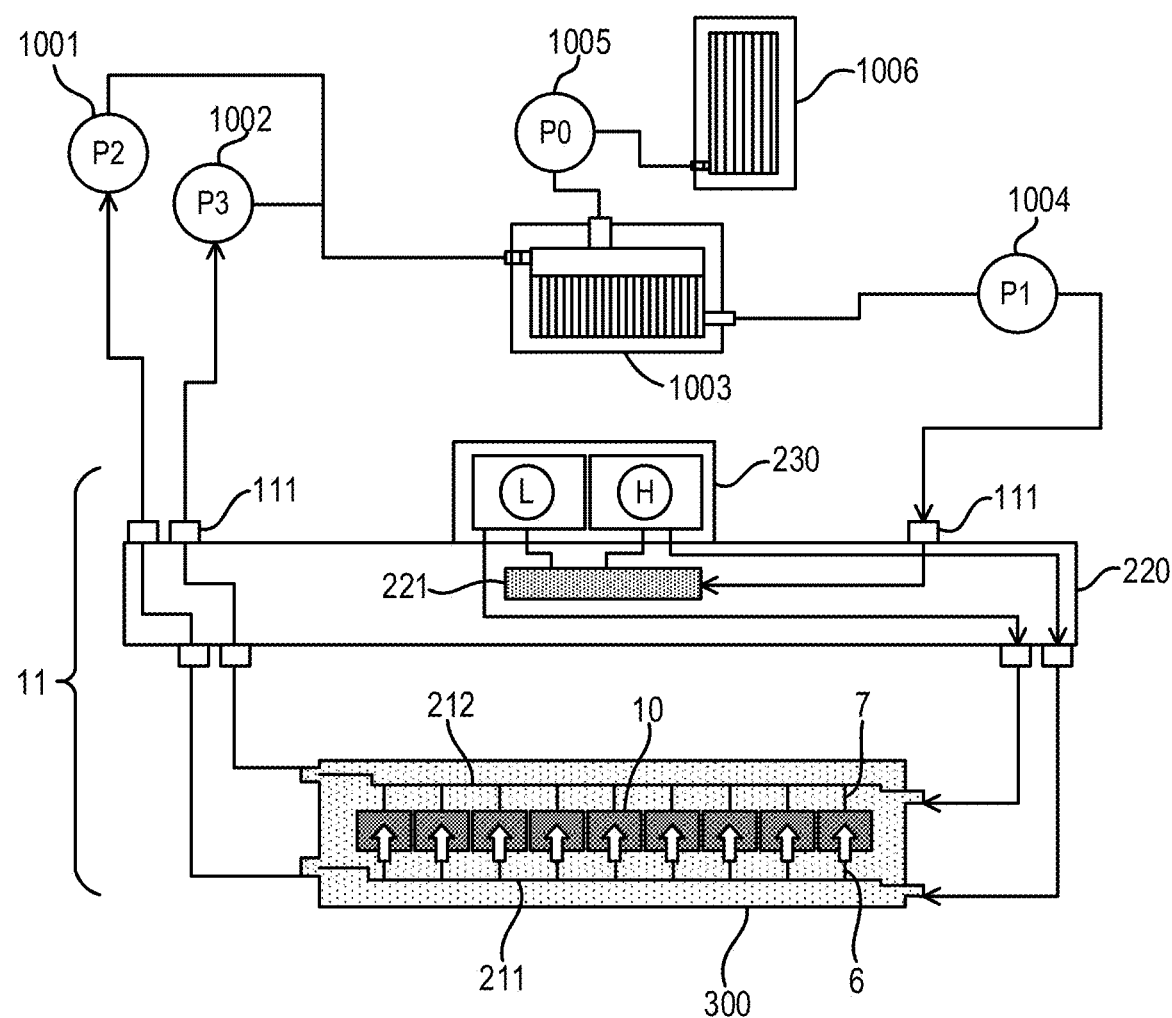
FIG. 6 is a schematic view illustrating a supply system of ink.

In the flow step, it is preferable to continuously or intermittently flow the ink. Hereinafter, a method of continuously or intermittently flowing the ink will be described in detail. First, the method of continuously flowing the ink will be described with reference to FIG. 6. FIG. 6 is a schematic view illustrating a supply system of ink. A line head 11 illustrated in FIG. 6 is connected to a first circulation pump (high pressure side) 1001, a first circulation pump (low pressure side) 1002, a buffer tank 1003 and a second circulation pump 1004. Although only a flow path for one color ink is illustrated in FIG. 6 in order to simplify the description, actually, flow paths for four colors of CMYK are provided in the line head 11, respectively.

The buffer tank 1003 connected to a main tank 1006 corresponding to the ink storage portion has an air circulation hole (not illustrated) and can discharge bubbles in the ink to the outside. The buffer tank 1003 is also connected to a replenishment pump 1005. The ink is ejected (discharged) from the ejection orifice at the time of image recording and suction recovery, such that the ink is consumed in the line head 11. The replenishment pump 1005 conveys an amount of ink corresponding to a consumption amount from the main tank 1006 to the buffer tank 1003.

The first circulation pump (high pressure side) 1001 and the first circulation pump (low pressure side) 1002 flow the ink in the line head 11 discharged from a liquid connection portion 111 to the buffer tank 1003. As the first circulation pump, it is preferable to use a positive displacement pump having quantitative liquid pumping capacity. Specific examples of this positive displacement pump can include a tube pump, a gear pump, a diaphragm pump, a syringe pump and the like. At the time of driving an ejection unit 300, the ink can be allowed to flow in a common inlet path 211 and a common outlet path 212 by the first circulation pump (high pressure side) 1001 and the first circulation pump (low pressure side) 1002.

A negative pressure control unit 230 includes two pressure adjustment mechanisms in which different control pressures are set. A pressure adjustment mechanism (high pressure side) H and a pressure adjustment mechanism (low pressure side) L are connected to the common inlet path 211 and the common outlet path 212 in an ejection unit 300, respectively, through a supply unit 220 provided with a filter 221 removing foreign materials from the ink. In the ejection unit 300, the common inlet path 211, the common outlet path 212 and the inlet path 6 and the outlet path 7 which are in communication with the ejection element substrate 10 are provided. Since the inlet path 6 and the outlet path 7 are in communication with the common inlet path 211 and the common outlet path 212, a partial flow (an arrow in FIG. 6) of ink from the common inlet path 211 to the common outlet path 212 through an internal flow path of the ejection element substrate 10 is generated. The flow of the ink in the internal flow path in the ejection element substrate 10 is indicated by the arrow in FIG. 4. That is, as illustrated in FIG. 4, the ink in the first flow path 17 passes between the ejection orifice 1 and the ejection element to flow to the second flow path 18.

As illustrated in FIG. 6, since the pressure adjustment mechanism H is connected to the common inlet path 211 and at the same time, the pressure adjustment mechanism L is connected to the common outlet path 212, a difference in pressure between the inlet path 6 and the outlet path 7 is generated. Therefore, a difference in pressure between the inlet 8 (FIG. 4) which is in communication with the inlet path 6 and the outlet 9 (FIG. 4) which is in communication with the outlet path 7 is also generated. In the case of flowing the ink due to the difference in pressure between the inlet 8 and the outlet 9, it is preferable to control a flow rate (mm/s) of the ink to be 0.1 mm/s or more to 10.0 mm/s or less.

In the ink jet recording method according to the present invention, even during a recovery operation of the recording head, the ink in the first flow path may be flowed to the second flow path. When the ink flows during the recovery operation of the recording head, the ink constantly flows. When the ink constantly flows, evaporation of water easily occurs, such that a concentration of circulating ink is likely to be increased. In order to suppress the concentration of the ink from being increased, it is preferable that a mechanism for adding water to the ink with the passage of time is provided in the ink jet recording apparatus. Further, it is preferable that a detector detecting the concentration of the ink is disposed in the ink jet recording apparatus and water is added to the ink in sync with an increase in concentration of the ink to be detected.

FIGS. 7A and 7B are schematic views for explaining a flow state of ink in the vicinity of an ejection orifice. The flow state of the ink in the vicinity of the ejection orifice is roughly divided into two types. The first is a flow state in which a circulation flow is not formed in the vicinity of a meniscus 12 of the ejection orifice as illustrated in FIG. 7A. The second is a flow state in which a circulation flow is formed in the vicinity of the meniscus 12 of the ejection orifice as illustrated in FIG. 7B. Even though the ink in the flow path has the same flow rate, the flow state of the ink in the vicinity of the meniscus 12 may not be constant. It is thought that the flow state of the ink depends on a thickness c of the ejection orifice formation member, a height d of the flow path and a diameter e of the ejection orifice rather than the flow rate of the ink in the flow path. For example, in the case in which a height d of flow path and a diameter e of the ejection orifice are the same as each other, when a thickness c of the ejection orifice formation member is large, the circulation flow is easily formed in the vicinity of the meniscus 12 as illustrated in FIG. 7B.

Figure 8:
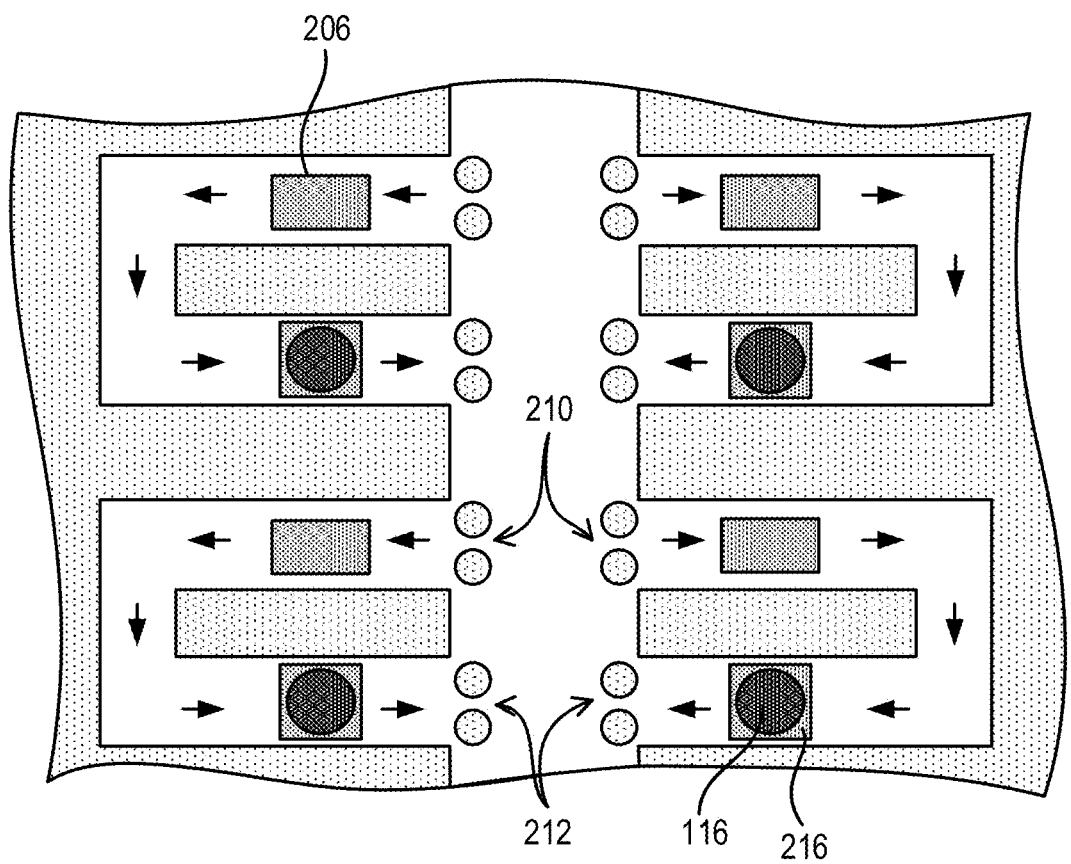
FIG. 8 is a cross-sectional view partially illustrating an example of the line head.

Next, a method of intermittently flowing ink will be described with reference to FIG. 8. FIG. 8 is a cross-sectional view partially illustrating an example of the line head. As illustrated in FIG. 8, the ink introduced from the inlet 210 flows in an arrow direction by an action of a circulation pump 206 corresponding to a flowing unit of the ink to thereby be discharged from the outlet 212. Further, the circulation pump 206 is a pump capable of intermittently flowing the ink. For this reason, the ink can intermittently flow between an ejection orifice 116 and an ejection element 216 by driving the circulation pump 206. In the case of intermittently flowing the ink, it is preferable to control a flow rate (m/s) of the ink to be 1.0 m/s or more to 10.0 m/s or less.

<Ink>

The ink used in the ink jet recording method and the ink jet recording apparatus according to the present invention is aqueous ink for ink jet containing a pigment and a compound having an ethylene oxide group. Hereinafter, respective components configuring the ink or physical properties of the ink are described in detail.

(Coloring Material)

As a coloring material contained in the ink, a pigment is used. A content (% by mass) of the coloring material in the ink is preferably 0.50% by mass or more to 15.00% by mass or less and more preferably, 1.00% by mass or more to 10.00% by mass or less, based on a total mass of the ink.

Specific examples of the pigment can include inorganic pigments such as carbon black and titanium oxide and organic pigments such as azo, phthalocyanine, quinacridone, isoindolinone, imidazolone, diketopyrrolopyrrole, dioxazine and the like.

As a dispersion method of the pigment, a resin-dispersed pigment using a resin as a dispersant, a self-dispersible pigment in which a hydrophilic group is bonded to a particle surface of the pigment or the like, can be used. Further, a resin-bonded pigment in which an organic group including a resin is chemically bonded to a particle surface of the pigment or a microcapsule pigment of which a particle surface is coated with a resin or the like, can be used.

As a resin dispersant for dispersing the pigment in an aqueous medium, it is preferable to use a resin dispersant capable of dispersing the pigment in the aqueous medium by an action of an anionic group. As the resin dispersant, resins to be described below, among them, a water-soluble resin can be used. A content (% by mass) of the pigment in the ink is preferably 0.3 times or more to 10.0 times or less as a mass ratio with respect to a content of the resin dispersant.

As the self-dispersible pigment, a self-dispersible pigment in which an anionic group such as a carboxylic acid group, a sulfonic acid group or a phosphonic acid group is bonded to the particle surface of the pigment directly or through another atomic (—R—) group can be used. The anionic group may be in an acid or salt form. In the case of a salt form, the anionic group may be in a state in which the anionic group is partially disassociated or in a state in which it is completely disassociated. When the anionic group is in the salt form, examples of cations corresponding to counterions can include alkaline metal cations, ammonium, organic ammonium and the like. Specific examples of another atomic (—R—) group can include a linear or branched alkylene group having 1 to 12 carbon atoms; arylene groups such as a phenylene group and a naphthylene group; a carbonyl group; an imino group; an amide group; a sulfonyl group; an ester group; an ether group and the like. Further, it is also possible to combine these groups.

In the case in which the pigment is a resin-dispersed pigment, it is preferable that a compound having an ethylene oxide group to be described below is at least one of a compound A and a compound B. Since a resin having a high molecular weight is adsorbed in a particle surface of the pigment as a resin dispersant in the resin-dispersed pigment, a compound having a relatively weak surface activity such as the compound A and compound B can form a three-dimensional network together with the resin dispersant. Therefore, the ink layer which is hardly affected by the speed of the circulation flow can be efficiently formed, such that occurrence of image unevenness can be further suppressed.

When the pigment is the self-dispersible pigment, it is preferable that a compound having an ethylene oxide group to be described below is a compound C. As compared to the resin-dispersed pigment, in the self-dispersible pigment, a particle surface of the pigment having high hydrophobicity is significantly exposed. For this reason, the compound having strong surface activity such as the compound C may be rapidly oriented to the pigment. Therefore, the ink layer which is hardly affected by the speed of the circulation flow can be efficiently formed, such that occurrence of image unevenness can be further suppressed.

(Compound Having Ethylene Oxide Group)

The ink used in the ink jet recording method and the ink jet recording apparatus according to the present invention contains the compound having an ethylene oxide group. A content (% by mass) of the compound having an ethylene oxide group in the ink is preferably 0.01% by mass or more to 30.00% by mass or less, and more preferably, 0.10% by mass or more to 15.00% by mass or less, based on a total mass of the ink.

The compound having an ethylene oxide group is at least one selected from the group consisting of the following compound A, compound B and compound C:

compound A: polyhydric alcohol derivative in which X mole(s) of ethylene oxide group(s) and Y mole(s) of propylene oxide group(s) are added to a polyhydric alcohol having three or more hydroxy groups and a proportion of $\{X/(X+Y)\}\times 100(\%)$ is 5% or more to 45% or less compound B: Polyethylene glycol having a number average molecular weight of 600 or more to 4,000 or less (provided, a content (% by mass) of the compound B in the ink is 0.10 times or more as a mass ratio with respect to a content (% by mass) of the pigment); and compound C: Polyoxyethylene alkyl ether having a hydrocarbon group in which the number of carbon atoms is 12 or more.

[Compound A]

The compound A is the polyhydric alcohol derivative in which X mole(s) of ethylene oxide group(s) and Y mole(s) of propylene oxide group(s) are added to a polyhydric alcohol having three or more hydroxy groups. In addition, the proportion of $\{X/(X+Y)\}\times 100(\%)$ of Compound A is 5% or more to 45% or less.

The polyhydric alcohol derivative (compound (A)) is an alkylene oxide modified polyhydric alcohol compound having a structure in which an ethylene oxide group and a propylene oxide group are added to a portion of a hydroxy group of a polyhydric alcohol having three or more hydroxy groups except for a hydrogen atom. The compound A is a compound having a branched structure with three or more hydroxy groups. For this reason, the compound A is hydrogen-bonded to hydrophilic groups of compounds present in the ink to thereby easily form a cross-link structure. Further, the propylene oxide group corresponding to a hydrophobic group loosely acts on the pigment, thereby forming the ink layer which is hardly affected by the speed of the circulation flow together with the pigment in the vicinity of the ejection orifice.

The polyhydric alcohol derivative has a structure represented by the following General Formula (1).

(1)

In General Formula (1), L is an alcohol residue except for hydroxy groups. In General Formula (1), R represents an ethylene oxide group or a propylene oxide group independently of each other, n is an integer of three or more and represents the number of alkylene oxide groups. The value of the sum of n in one molecule of the polyhydric alcohol derivative is equal to the value of X+Y, and m is an integer of three or more and equal to the number of hydroxy groups of polyhydric alcohol. In General Formula (2), the ethylene oxide group and the propylene oxide group represented by R may be a block structure or a random structure. The mole numbers and the proportions of the ethylene oxide group and the propylene oxide group represented by R are calculated on the assumption that the mole numbers and the proportions are added in average to a plurality of Rs as average values of the mole numbers of the ethylene oxide group(s) and the propylene oxide group(s) added to the whole of one molecule of the polyhydric alcohol derivative.

An ethylene oxide group is expressed as —$CH_2CH_2O$—. The propylene oxide group is expressed as —$CH_2CH(CH_3)O$—. The proportion of $\{Y/(X+Y)\}\times 100(\%)$ expressed by using the mole number X of the ethylene oxide group(s) and the mole number Y of the propylene oxide group(s) in one molecule of the polyhydric alcohol derivative is 5% or more to 45% or less and preferably 10% or more to 30% or less. When the proportion of {X/(X+Y)}×100(%) is less than 5%, since an amount of the propylene oxide group corresponding to the hydrophobic group is excessively large, interactions with the pigment become excessively increased, and at the same time, affinity between the compound and water molecules is excessively low, such that it is impossible to suppress occurrence of image unevenness. On the other hand, when the proportion of {X/(X+Y)}×100(%) is more than 45%, it is impossible to suppress occurrence of image unevenness. The reason is that since an amount of the ethylene oxide group corresponding to a hydrophilic group is excessively large, interactions with the pigment become excessively decreased, and at the same time, the compound has properties similar to those of water molecules to exhibit a behavior similar to that of the water molecules, such that the ink layer which is hardly affected by the speed of the circulation flow is not formed.

The number of the hydroxy groups of the polyhydric alcohol which is a main skeleton of the polyhydric alcohol derivative is 3 or more. The number of the hydroxy groups of the polyhydric alcohol is preferably 10 or less and more preferably 3 or more to 6 or less. When the number of the polyhydric alcohol is less than 3, since an action on the pigment by the hydrophobic group becomes insufficient, it is impossible to form the ink layer which is hardly affected by the speed of the circulation flow, such that it is impossible to suppress occurrence of image unevenness.

Examples of the polyhydric alcohol can include sorbitol, maltitol, xylitol, erythritol, lactitol, mannitol, glycerin, polyglycerin, oligosaccharide alcohol, palatinit, threitol, arabinitol, ribitol, iditol, volemitol, perseitol, octitol, galactitol, trimethylolpropane, trimethylolethane and condensates thereof. Among them, particularly, sorbitol is preferable. Since a polyhydric alcohol derivative containing sorbitol as a main skeleton has a good balance between hydrophilicity and hydrophobicity, particularly, image unevenness can be effectively suppressed.

A content (% by mass) of the compound A in the ink is preferably 0.50% by mass or more to 15.00% by mass or less and more preferably, 0.50% by mass or more to 10.00% by mass or less, based on a total mass of the ink. Further, it is more preferable that the content (% by mass) of the compound A in the ink is 0.20 times or more to 3.50 times or less as a mass ratio with respect to a content (% by mass) of the pigment. When the mass ratio is less than 0.20 times, it can be slightly difficult to control the viscosity of the ink in the vicinity of the ejection orifice, such that an effect of suppressing image unevenness may be slightly deteriorated. Meanwhile, when the mass ratio is more than 3.50 times, since the viscosity of the ink is excessively increased, the effect of suppressing image unevenness may be slightly deteriorated.

A molecular weight of the compound A is preferably 1,500 or more to 25,000 or less, more preferably 2,000 or more to 15,000 or less and particularly preferably, 3,000 or more to 10,000 or less. Further, in some cases, in the polyhydric alcohol derivative, the number of moles of the ethylene oxide group or the propylene oxide group has a distribution. In this case, the molecular weight can be computationally calculated using an average value of the numbers of moles.

[Compound B]

The compound B is polyethylene glycol having a number average molecular weight of 600 or more to 4,000 or less. In the case of using the compound B as the compound having an ethylene oxide group, a content (% by mass) of the compound B in the ink needs to be 0.10 times or more as a mass ratio with respect to the content (% by mass) of the pigment. When the mass ratio is less than 0.10 times, it is impossible to maintain the viscosity of the ink in the vicinity of the ejection orifice within a preferable range, such that it is impossible to suppress occurrence of image unevenness. Since polyethylene glycol has a large number of ethylene oxide groups in a molecular structure, it has high affinity with water molecules, but since polyethylene glycol has almost no hydrophobic group, it is difficult to selectively act on the meniscus or the pigment. For this reason, unless a certain amount or more of polyethylene glycol with respect to the pigment is contained, the ink layer which is hardly affected by the speed of the circulation flow is not formed and it is considered that occurrence of image unevenness cannot be suppressed. It is preferable that the content (% by mass) of the compound B in the ink is 3.00 times or less as the mass ratio with respect to a content (% by mass) of the pigment. When the mass ratio is more than 3.00 times, the viscosity of the ink is excessively increased, such that the effect of suppressing image unevenness may be slightly deteriorated.

The content (% by mass) of the compound B in the ink is preferably 0.10% by mass or more to 15.00% by mass or less, and more preferably, 0.30% by mass or more to 10.00% by mass or less, based on the total mass of the ink.

Polyethylene glycol having a number average molecular weight of 600 or more to 4,000 or less can be present in the vicinity of the ejection orifice while suppressing an increase in viscosity. For this reason, the effect of suppressing image unevenness can be obtained by using polyethylene glycol having a number average molecular weight of 600 or more to 4,000 or less as the compound B. When the number average molecular weight of polyethylene glycol is less than 600, since the molecular weight is excessively small, polyethylene glycol is difficult to remain in the vicinity of the ejection orifice. For this reason, it is difficult to control the thickening of the ink in the vicinity of the ejection orifice, such that image unevenness easily occurs. When the number average molecular weight of polyethylene glycol is more than 4,000, the viscosity of the ink is excessively high, such that it is impossible to suppress image unevenness. Among them, it is preferable to use polyethylene glycol having a number average molecular weight of 600 or more to 2,000 or less.

The number average molecular weight of polyethylene glycol can be measured and calculated according to the following procedure. After adding 1 g of polyethylene glycol to be measured (weighed to the digit of 0.1 mg) to 25 mL of anhydrous pyridine phthalate solution accurately weighed using a flask with a stopper, the stopper is closed, and the mixture is heated for 2 hours in a boiling water bath and kept until a temperature of the mixture became room temperature. Thereafter, 50 mL of 0.5 mol/L aqueous solution of sodium hydroxide (accurately weighed) and 10 drops of a phenolphthalein solution for titration are put into the flask. A liquid in the flask is titrated with a 0.5 mol/L aqueous solution of sodium hydroxide, a point at which the liquid keeps a red color for 15 seconds is considered as an end point. The number average molecular weight of polyethylene glycol can be calculated from the obtained titration amount M (mL) and a titration amount R (mL) obtained by a blank test performed in the same manner as described above except that polyethylene glycol is not used according to the following Equation.

Number average molecular weight={(amount (g) of polyethylene glycol)×4,000}/{(M−R)×0.5 (mol/L)}

[Compound C]

The compound C is polyoxyethylene alkyl ether having a hydrocarbon group in which the number of carbon atoms is 12 or more. The compound C includes an ethylene oxide group corresponding to a hydrophilic group and a long-chain alkyl group corresponding to a hydrophobic group in its molecule in a state in which the ethylene oxide group and the long-chain alkyl group are clearly separated from each other. For this reason, when the ink in the vicinity of the ejection orifice is evaporated and thickened, the compound C is effectively oriented to the pigment to thereby form the ink layer which is hardly affected by the speed of the circulation flow together with the pigment in the vicinity of the ejection orifice.

When the number of carbon atoms in the hydrocarbon group is less than 12, since a ratio of the hydrophilic groups is excessively large, a hydrophilic molecular behavior is exhibited, such that performance as a surfactant is deteriorated. Therefore, orientation to the pigment becomes difficult, such that the ink layer which is hardly affected by the speed of the circulation flow is not formed, and thus it is impossible to suppress image unevenness. It is preferable that the number of carbon atoms in the hydrocarbon group is 22 or less.

Polyoxyethylene alkyl ether is a compound (surfactant) represented by R—O—(CH$_2$CH$_2$O)$_x$—H. R is the hydrocarbon group in which the number of carbon atoms is 12 or more. Examples of the hydrocarbon group can include a lauryl group (12), a myristyl group (14), a cetyl group (16), a stearyl group (18), an oleyl group (18), a linoleyl group (18), a behenyl group (22) and the like (here, numbers in parentheses mean the number of carbon atoms.). Further, x is an integer indicating the number of moles of added ethylene oxide groups and is preferably 8 or more to 100 or less and more preferably 10 or more to 50 or less.

A content (% by mass) of the compound C in the ink is preferably 0.01% by mass or more to 5.00% by mass or less and more preferably, 0.05% by mass or more to 1.50% by mass or less, based on the total mass of the ink. Further, it is preferable that the content (% by mass) of the compound C in the ink is 0.02 times or more to 0.50 times or less as a mass ratio with respect to the content (% by mass) of the pigment. When the mass ratio is less than 0.02 times, it is slightly difficult to control the viscosity of the ink in the vicinity of the ejection orifice, such that the effect of suppressing image unevenness may be slightly deteriorated. Meanwhile, when the mass ratio is more than 0.50 times, surface tension of the ink is easily decreased, and a color developability of an image may not be sufficiently obtained.

It is preferable that an HLB value of the compound C obtained by a Griffin method is 12.0 or more. When the HLB value is less than 12.0, since the number of ethylene oxide groups in one molecule is small, affinity with water is slightly weakened. For this reason, it is slightly difficult to control the viscosity of the ink in the vicinity of the ejection orifice, such that the effect of suppressing image unevenness may be slightly deteriorated. The HLB value by the Griffin method can be calculated from Equation, "HLB value=20× (Formula weight of an ethylene oxide group of a surfactant)/ (Molecular weight of the surfactant)". The HLB value obtained by the Griffin method is a physical property value indicating a degree of hydrophilicity or lipophilicity of the surfactant (compound) and is a value in a range of 0.0 to 20.0. The smaller the HLB value, the higher the lipophilicity, and the larger the HLB value, the higher the hydrophilicity.

(Resin)

A resin can be contained in the ink. A content (% by mass) of the resin in the ink is preferably 0.10% by mass or more to 20.00% by mass or less and more preferably, 0.50% by mass or more to 15.00% by mass or less, based on the total mass of the ink.

The resin can be added to the ink, (i) in order to stabilize a dispersion state of the pigment, that is, as the resin dispersant or a dispersing aid. Further, the resin can be added to the ink (ii) in order to improve various properties of an image to be recorded. As a form of the resin, there are a block copolymer, a random copolymer, a graft copolymer, a combination thereof and the like. Further, the resin may be a water-soluble resin capable of being dissolved in an aqueous medium. Alternatively, the resin may also be a resin particle dispersed in the aqueous medium. The resin particle does not have to contain the coloring material.

As used herein, "the resin is water-soluble" means that the resin is present in an aqueous medium in a state in which the resin does not form a particle of which a diameter can be measured by a dynamic light scattering method when the resin is neutralized with an alkali in a molar amount equivalent to an acid value. Whether or not the resin is water-soluble can be determined by a method described below. First, a liquid (resin solid content: 10% by mass) containing a resin neutralized with an alkali (sodium hydroxide, potassium hydroxide or the like) equivalent to an acid value is prepared. Next, the prepared liquid is diluted with pure water 10 times (based on volume), thereby preparing a test solution. Then, in the case of measuring a particle diameter of the resin in the test solution using the dynamic light scattering method, when a particle having a diameter is not measured, it can be judged that the resin is water-soluble. Here, for example, measurement conditions are as follows.

[Measurement Conditions]

SetZero: 30 seconds

Number of measurement: 3 times

Measurement time: 180 seconds

As a particle size distribution measurement device, a particle size analyzer (for example, trade name "UPA-EX150" manufactured by Nikkiso Co., Ltd.) using the dynamic light scattering method or the like, can be used. However, the used particle size distribution measurement device or measurement conditions are not limited thereto.

It is preferable that the acid value of the water-soluble resin is 100 mgKOH/g or more to 250 mgKOH/g or less. It is preferable that an acid value of the resin constituting the resin particle is 5 mgKOH/g or more to 100 mgKOH/g or less. It is preferable that a weight average molecular weight of the water-soluble resin is 3,000 or more to 15,000 or less. It is preferable that a weight average molecular weight of the resin constituting the resin particle is 1,000 or more to 2,000,000 or less. It is preferable that a volume average particle diameter of the resin particle measured by the dynamic light scattering method is 100 nm or more to 500 nm or less.

Examples of the resin can include an acrylic resin, a urethane based resin, an olefin based resin and the like. Among them, the acrylic resin or the urethane based resin is preferable.

As the acrylic resin, an acrylic resin having a hydrophilic unit and a hydrophobic unit as constituent units is preferable. Among them, a resin having a hydrophilic unit derived from (meth)acrylic acid and a hydrophobic unit derived from at least one of a monomer having an aromatic ring and an (meth)acrylic acid ester based monomer is preferable. Particularly, a resin having a hydrophilic unit derived from (meth)acrylic acid and a hydrophobic unit derived from at least one monomer of styrene and α-methylstyrene is preferable. Since interactions between these resins and the pigment easily occur, these resins can be preferably used as the resin dispersant for dispersing the pigment.

The hydrophilic unit is a unit having a hydrophilic group such as an anionic group or the like. The hydrophilic unit can be formed by polymerizing, for example, a hydrophilic monomer having a hydrophilic group. Specific examples of the hydrophilic monomer having a hydrophilic group can include acidic monomers having a carboxylic acid group such as (meth)acrylic acid, itaconic acid, maleic acid, fumaric acid or the like, anionic monomers such as anhydrides or salts of these acid monomers and the like. Examples of cations constituting the salts of the acidic monomers can include lithium, sodium, potassium, ammonium and organic ammonium ions. The hydrophobic unit is a unit that does not have the hydrophilic group such as the anionic group or the like. The hydrophobic unit can be formed by polymerizing, for example, a hydrophobic monomer that does not have the hydrophilic group such as the anionic group or the like. Specific examples of the hydrophobic monomer can include monomers having an aromatic ring such as styrene, α-methylstyrene, benzyl (meth)acrylate; (meth)acrylic acid ester based monomers such as methyl (meth)acrylate, butyl (meth)acrylate, 2-ethylhexyl (meth)acrylate and the like.

The urethane based resin can be obtained by reacting, for example, polyisocyanate and a component (polyol or polyamine) reacting with polyisocyanate. Further, a cross-linking agent or a chain extender may be additionally reacted therewith.

(Aqueous Medium)

The ink used in the ink jet recording method according to the present invention is aqueous ink containing at least water as an aqueous medium. Water or an aqueous medium corresponding to a mixed solvent of water and a water-soluble organic solvent can be contained in the ink. It is preferable to use deionized water or ion-exchange water as the water. A content (% by mass) of the water in the aqueous ink is preferably 50.00% by mass or more to 95.00% by mass or less, based on the total mass of the ink. Further, a content (% by mass) of the water-soluble organic solvent in the aqueous ink is preferably 3.00% by mass or more to 50.00% by mass or less, based on the total mass of the ink. As the water-soluble organic solvent, any water-soluble organic solvent can be used as long as it can be used in the ink for inkjet. For example, alcohols, (poly)alkylene glycols other than the compound B, glycol ethers, nitrogen-containing compounds, sulfur-containing compounds can be used.

(Other Additives)

If necessary, various additives such as a defoaming agent, other surfactants, a pH adjusting agent, a viscosity modifier, a rust preventing agent, an antiseptic, an antifungal agent, an antioxidant and a reduction inhibitor in addition to the above-mentioned ingredients may be contained in the ink.

EXAMPLE

Hereinafter, the present invention will be described in more detail through Examples and Comparative Examples, but the present invention is not limited to the following Examples as long as the present invention does not depart from the gist thereof. Unless otherwise specified, the terms "part(s)" and "%" indicating component amounts are based on mass.

<Preparation of Pigment Dispersion Liquid>

(Pigment Dispersion Liquid 1)

A styrene-acrylic acid copolymer (resin) having an acid value of 200 mgKOH/g and a weight average molecular weight of 10,000 was prepared. An aqueous solution of a resin dispersant in which a content (solid content) of the resin was 20.0% was prepared by dissolving the prepared resin in ion exchange water while neutralizing the prepared resin with sodium hydroxide (moles equivalent to the acid value). After putting a mixture of 15.0 parts of a pigment (C.I. pigment blue 15:3), 30.0 parts of the aqueous solution of the resin dispersant and 55.0 parts of water into a sand grinder and dispersing the mixture for 1 hour, centrifugation was performed thereon, thereby removing coarse particles. The resultant was subjected to pressure-filtration using a micro filter (manufactured by FUJIFILM Corporation) having a pore size of 3.0 μm, and then a suitable amount of ion exchange water was added thereto, thereby obtaining a pigment dispersion liquid 1. A content of the pigment in the obtained pigment dispersion liquid 1 was 15.0% and a content of the resin dispersant was 6.0%.

(Pigment Dispersion Liquid 2)

A pigment dispersion liquid 2 in which a content of a pigment was 15.0% and a content of a resin dispersant was 6.0% was obtained by a procedure similar to that in the above-mentioned pigment dispersion liquid 1 except for changing the kind of pigment to C.I. pigment red 122.

(Pigment Dispersion Liquid 3)

A pigment dispersion liquid 3 in which a content of a pigment was 15.0% and a content of a resin dispersant was 6.0% was obtained by a procedure similar to that in the above-mentioned pigment dispersion liquid 1 except for changing the kind of pigment to C.I. pigment yellow 74.

(Pigment Dispersion Liquid 4)

A pigment dispersion liquid 4 in which a content of a pigment was 15.0% and a content of a resin dispersant was 6.0% was obtained by a procedure similar to that in the above-mentioned pigment dispersion liquid 1 except for changing the kind of pigment to carbon black.

(Pigment Dispersion Liquid 5)

A solution in which 5.0 g of concentrated hydrochloric acid was dissolved in 5.5 g of water was cooled to 5° C., and in this state, 1.6 g of 4-aminophthalic acid was added thereto. A vessel charged with this solution was put into an ice bath and stirred, and a solution obtained by dissolving 2.2 g of sodium nitrite in 9.0 g of ion exchange water at 5° C. was added thereto while maintaining a temperature of the solution to 10° C. or less. After stirring for 15 minutes, 6.0 g of carbon black (specific surface area: 220 $m^2/g$, DBP oil absorption amount: 105 mL/100 g) was added thereto under the stirring, and stirring was additionally performed for 15 minutes, thereby obtaining slurry. The obtained slurry was filtered with filter paper (trade name: "Standard filter paper No. 2", manufactured by Advantec), and particles were sufficiently washed with water and dried in an oven at 110° C. A content of the pigment was adjusted by adding a suitable amount of water thereto, thereby obtaining a pigment dispersion liquid 5 in which the content of the pigment was 15.0%.

<Preparation of Compounds A to D>

(Compound A)

Compounds illustrated in Table 1 were prepared. In Table 1, "m" and "n" are values of "m" and "n" in the following Formulas (A) to (D). A compound A-15 was polyoxypropylene glyceryl ether (trade name: "Sannix GP-250", manufactured by Sanyo Chemical Industries, Ltd.).

TABLE 1

Properties of Compound A

| Compound | Structure | Polyhydric Alcohol Kind | Valence | m | Sum of n (X + Y) | Alkylene Oxide Group Ethylene Oxide Group (X mole) | Propylene Oxide Group (Y mole) | Value (%) of $(X/(X+Y))*$ 100 | Molecular Weight |
|---|---|---|---|---|---|---|---|---|---|
| A-1 | (A) | Sorbitol | 6 | 4 | 100 | 5 | 95 | 5 | 5,920 |
| A-2 | (A) | Sorbitol | 6 | 4 | 100 | 10 | 90 | 10 | 5,850 |
| A-3 | (A) | Sorbitol | 6 | 4 | 100 | 20 | 80 | 20 | 5,709 |
| A-4 | (A) | Sorbitol | 6 | 4 | 100 | 30 | 70 | 30 | 5,569 |
| A-5 | (A) | Sorbitol | 6 | 4 | 100 | 35 | 65 | 35 | 5,499 |
| A-6 | (A) | Sorbitol | 6 | 4 | 100 | 45 | 55 | 45 | 5,359 |
| A-7 | (B) | Glycerin | 3 | 1 | 100 | 20 | 80 | 20 | 5,615 |
| A-8 | (C) | Trimethylolpropane | 3 | 1 | 100 | 20 | 80 | 20 | 5,661 |
| A-9 | (A) | Xylitol | 4 | 2 | 100 | 20 | 80 | 20 | 5,649 |
| A-10 | (B) | Polyglycerin (Octamer) | 10 | 8 | 100 | 20 | 80 | 20 | 6,134 |
| A-11 | (A) | Sorbitol | 6 | 4 | 100 | 0 | 100 | 0 | 5,990 |
| A-12 | (A) | Sorbitol | 6 | 4 | 100 | 50 | 50 | 50 | 5,289 |
| A-13 | (A) | Sorbitol | 6 | 4 | 100 | 100 | 0 | 100 | 4,587 |
| A-14 | (D) | Ethylene Glycol | 2 | — | 100 | 20 | 80 | 20 | 5,589 |
| A-15 | (B) | Glycerin | 3 | 1 | 100 | 0 | 4.1 | 0 | 250 |

"Structures" of polyhydric alcohol derivatives in Table 1 are as follows.

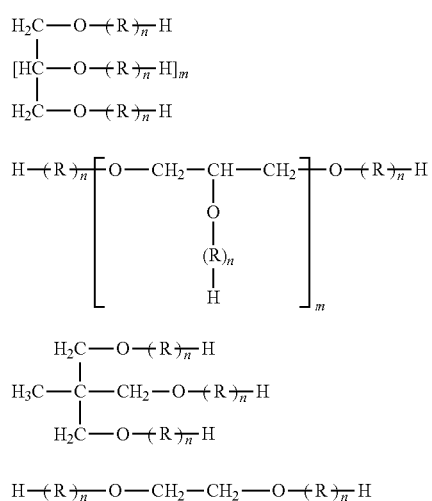

(Compound B)
Compounds illustrated in Table 2 were prepared. A compound B-9 is polyoxyethylene polyoxypropylene glycol (trade name: "Newpol PE-108", ethylene oxide group (85 moles), propylene oxide group (15 moles), number average molecular weight: 16,500, manufactured by Sanyo Chemical Industries, Ltd).

TABLE 2

Properties of Compound B

| Compound | Kind | Number Average Molecular Weight |
|---|---|---|
| B-1 | Polyethylene Glycol | 600 |
| B-2 | Polyethylene Glycol | 1,000 |
| B-3 | Polyethylene Glycol | 2,000 |
| B-4 | Polyethylene Glycol | 4,000 |
| B-5 | Polypropylene Glycol | 1,000 |

TABLE 2-continued

Properties of Compound B

| Compound | Kind | Number Average Molecular Weight |
|---|---|---|
| B-6 | Polyethylene Glycol | 200 |
| B-7 | Polyethylene Glycol | 400 |
| B-8 | Polyethylene Glycol | 6,000 |
| B-9 | Polyoxyethylene Polyoxypropylene Glycol | 16,000 |

(Compound C)
Compounds illustrated in Table 3 were prepared. A compound C-9 is triethylene glycol monobutylether (the number of carbon atoms in a hydrocarbon group is 4, and an HLB value by a Griffin method is 12.8).

TABLE 3

Properties of Compound C

| Compound | Hydrocarbon Group Kind | Number of Carbon atoms | Number of moles of Added Ethylene Oxide Group | HLB |
|---|---|---|---|---|
| C-1 | Oleyl Group | 18 | 50 | 17.8 |
| C-2 | Cetyl Group | 16 | 20 | 15.7 |
| C-3 | Lauryl Group | 12 | 50 | 18.4 |
| C-4 | Lauryl Group | 12 | 9 | 13.6 |
| C-5 | Lauryl Group | 12 | 10 | 14.0 |
| C-6 | Cetyl Group | 16 | 7 | 11.2 |
| C-7 | Stearyl Group | 18 | 10 | 12.4 |
| C-8 | Decyl Group | 10 | 10 | 14.7 |
| C-9 | Butyl Group | 4 | 3 | 12.8 |

<Preparation of Ink>
Respective components (unit: %) illustrated in upper portions of Tables 4 to 6 were mixed and sufficiently stirred and then subjected to pressure-filtration using a cellulose acetate filter (manufactured by Advantec) having a pore size of 3.0 μm, thereby preparing respective inks. "Acetylenol E60" is a trade name of a surfactant manufactured by Kawaken Fine Chemicals Co., Ltd. Contents and mass ratios of respective components in the ink are illustrated in lower ends of Tables 4 to 6.

TABLE 4

Composition and Properties of Ink A

| | Ink | | | | | | | | | | | | |
|---|---|---|---|---|---|---|---|---|---|---|---|---|---|
| | A-1 | A-2 | A-3 | A-4 | A-5 | A-6 | A-7 | A-8 | A-9 | A-10 | A-11 | A-12 | A-13 |
| Pigment Dispersion Liquid No. | 1 | 2 | 3 | 4 | 1 | 1 | 1 | 1 | 1 | 1 | 1 | 1 | 1 |
| Kind of Compound A | A-3 | A-3 | A-3 | A-3 | A-3 | A-1 | A-2 | A-4 | A-5 | A-6 | A-7 | A-8 | A-9 |
| Pigment Dispersion Liquid | 20.00 | 20.00 | 20.00 | 20.00 | 20.00 | 20.00 | 20.00 | 20.00 | 20.00 | 20.00 | 20.00 | 20.00 | 20.00 |
| Compound A | 1.50 | 1.50 | 1.50 | 1.50 | 1.50 | 1.50 | 1.50 | 1.50 | 1.50 | 1.50 | 1.50 | 1.50 | 1.50 |
| Compound B-2 | | | | | 1.50 | | | | | | | | |
| Compound B-9 | | | | | | | | | | | | | |
| Compound C-9 | | | | | | | | | | | | | |
| Glycerin | 10.00 | 10.00 | 10.00 | 10.00 | 10.00 | 10.00 | 10.00 | 10.00 | 10.00 | 10.00 | 10.00 | 10.00 | 10.00 |
| Trimethylol propane | 13.50 | 13.50 | 13.50 | 13.50 | 12.00 | 13.50 | 13.50 | 13.50 | 13.50 | 13.50 | 13.50 | 13.50 | 13.50 |
| Acetylenol E60 | 0.50 | 0.50 | 0.50 | 0.50 | 0.50 | 0.50 | 0.50 | 0.50 | 0.50 | 0.50 | 0.50 | 0.50 | 0.50 |
| Ion Exchange Water | 54.50 | 54.50 | 54.50 | 54.50 | 54.50 | 54.50 | 54.50 | 54.50 | 54.50 | 54.50 | 54.50 | 54.50 | 54.50 |
| Content P (%) of Pigment | 3.00 | 3.00 | 3.00 | 3.00 | 3.00 | 3.00 | 3.00 | 3.00 | 3.00 | 3.00 | 3.00 | 3.00 | 3.00 |
| Content A (%) of Compound A | 1.50 | 1.50 | 1.50 | 1.50 | 1.50 | 1.50 | 1.50 | 1.50 | 1.50 | 1.50 | 1.50 | 1.50 | 1.50 |
| A/P Value (times) | 0.50 | 0.50 | 0.50 | 0.50 | 0.50 | 0.50 | 0.50 | 0.50 | 0.50 | 0.50 | 0.50 | 0.50 | 0.50 |
| Content B (%) of Compound B | 0.00 | 0.00 | 0.00 | 0.00 | 1.50 | 0.00 | 0.00 | 0.00 | 0.00 | 0.00 | 0.00 | 0.00 | 0.00 |
| B/P Value (times) | 0.00 | 0.00 | 0.00 | 0.00 | 0.50 | 0.00 | 0.00 | 0.00 | 0.00 | 0.00 | 0.00 | 0.00 | 0.00 |
| Content C (%) of Compound C | 0.00 | 0.00 | 0.00 | 0.00 | 0.00 | 0.00 | 0.00 | 0.00 | 0.00 | 0.00 | 0.00 | 0.00 | 0.00 |
| C/P Value (times) | 0.00 | 0.00 | 0.00 | 0.00 | 0.00 | 0.00 | 0.00 | 0.00 | 0.00 | 0.00 | 0.00 | 0.00 | 0.00 |

| | Ink | | | | | | | | | | | | |
|---|---|---|---|---|---|---|---|---|---|---|---|---|---|
| | A-14 | A-15 | A-16 | A-17 | A-18 | A-19 | A-20 | A-21 | A-22 | A-23 | A-24 | A-25 | A-26 |
| Pigment Dispersion Liquid No. | 1 | 1 | 1 | 1 | 1 | 5 | 5 | 1 | 1 | 1 | 1 | 1 | 1 |
| Kind of Compound A | A-10 | A-3 | A-3 | A-3 | A-3 | A-3 | A-7 | A-11 | A-12 | A-13 | A-14 | A-15 | A-15 |
| Pigment Dispersion Liquid | 20.00 | 20.00 | 20.00 | 20.00 | 20.00 | 20.00 | 20.00 | 20.00 | 20.00 | 20.00 | 20.00 | 20.00 | 20.00 |
| Compound A | 1.50 | 0.50 | 0.60 | 10.50 | 10.80 | 1.50 | 0.50 | 1.50 | 1.50 | 1.50 | 1.50 | 1.50 | 10.00 |
| Compound B-2 | | | | | | | | | | | | | |
| Compound B-9 | | | | | | | | | | | | | 0.70 |
| Compound C-9 | | | | | | | | | | | | | 5.00 |
| Glycerin | 10.00 | 10.00 | 10.00 | 10.00 | 10.00 | 10.00 | 10.00 | 10.00 | 10.00 | 10.00 | 10.00 | 10.00 | 9.30 |
| Trimethylol propane | 13.50 | 14.50 | 14.40 | 4.50 | 4.20 | 13.50 | 14.50 | 13.50 | 13.50 | 13.50 | 13.50 | 13.50 | |
| Acetylenol E60 | 0.50 | 0.50 | 0.50 | 0.50 | 0.50 | 0.50 | 0.50 | 0.50 | 0.50 | 0.50 | 0.50 | 0.50 | 0.50 |
| Ion Exchange Water | 54.50 | 54.50 | 54.50 | 54.50 | 54.50 | 54.50 | 54.50 | 54.50 | 54.50 | 54.50 | 54.50 | 54.50 | 54.50 |
| Content P (%) of Pigment | 3.00 | 3.00 | 3.00 | 3.00 | 3.00 | 3.00 | 3.00 | 3.00 | 3.00 | 3.00 | 3.00 | 3.00 | 3.00 |
| Content A (%) of Compound A | 1.50 | 0.50 | 0.60 | 10.50 | 10.80 | 1.50 | 0.50 | 1.50 | 1.50 | 1.50 | 1.50 | 1.50 | 10.00 |
| A/P Value (times) | 0.50 | 0.17 | 0.20 | 3.50 | 3.60 | 0.50 | 0.17 | 0.50 | 0.50 | 0.50 | 0.50 | 0.50 | 3.33 |
| Content B (%) of Compound B | 0.00 | 0.00 | 0.00 | 0.00 | 0.00 | 0.00 | 0.00 | 0.00 | 0.00 | 0.00 | 0.00 | 0.00 | 0.70 |
| B/P Value (times) | 0.00 | 0.00 | 0.00 | 0.00 | 0.00 | 0.00 | 0.00 | 0.00 | 0.00 | 0.00 | 0.00 | 0.00 | 0.23 |
| Content C (%) of Compound C | 0.00 | 0.00 | 0.00 | 0.00 | 0.00 | 0.00 | 0.00 | 0.00 | 0.00 | 0.00 | 0.00 | 0.00 | 5.00 |
| C/P Value (times) | 0.00 | 0.00 | 0.00 | 0.00 | 0.00 | 0.00 | 0.00 | 0.00 | 0.00 | 0.00 | 0.00 | 0.00 | 1.67 |

TABLE 5

Composition and Properties of Ink B

| | Ink | | | | | | | | | |
|---|---|---|---|---|---|---|---|---|---|---|
| | B-1 | B-2 | B-3 | B-4 | B-5 | B-6 | B-7 | B-8 | B-9 | B-10 |
| Pigment Dispersion Liquid No. | 1 | 2 | 3 | 4 | 1 | 1 | 1 | 1 | 1 | 1 |
| Kind of Compound B | B-2 | B-2 | B-2 | B-2 | B-2 | B-1 | B-3 | B-4 | B-2 | B-2 |
| Pigment Dispersion Liquid | 20.00 | 20.00 | 20.00 | 20.00 | 20.00 | 20.00 | 20.00 | 20.00 | 20.00 | 20.00 |
| Compound B | 1.50 | 1.50 | 1.50 | 1.50 | 1.50 | 1.50 | 1.50 | 1.50 | 0.30 | 9.00 |
| Compound A-15 | | | | | | | | | | |
| Compound C-2 | | | | | 0.20 | | | | | |
| Compound C-9 | | | | | | | | | | |
| Glycerin | 10.00 | 10.00 | 10.00 | 10.00 | 10.00 | 10.00 | 10.00 | 10.00 | 10.00 | 10.00 |
| Trimethylol propane | 13.50 | 13.50 | 13.50 | 13.50 | 13.30 | 13.50 | 13.50 | 13.50 | 14.70 | 6.00 |
| Acetylenol E60 | 0.50 | 0.50 | 0.50 | 0.50 | 0.50 | 0.50 | 0.50 | 0.50 | 0.50 | 0.50 |
| Ion Exchange Water | 54.50 | 54.50 | 54.50 | 54.50 | 54.50 | 54.50 | 54.50 | 54.50 | 54.50 | 54.50 |
| Content P (%) of Pigment | 3.00 | 3.00 | 3.00 | 3.00 | 3.00 | 3.00 | 3.00 | 3.00 | 3.00 | 3.00 |

TABLE 5-continued

Composition and Properties of Ink B

| | | | | | | | | | | |
|---|---|---|---|---|---|---|---|---|---|---|
| Content A (%) of Compound A | 0.00 | 0.00 | 0.00 | 0.00 | 0.00 | 0.00 | 0.00 | 0.00 | 0.00 | 0.00 |
| A/P Value (times) | 0.00 | 0.00 | 0.00 | 0.00 | 0.00 | 0.00 | 0.00 | 0.00 | 0.00 | 0.00 |
| Content B (%) of Compound B | 1.50 | 1.50 | 1.50 | 1.50 | 1.50 | 1.50 | 1.50 | 1.50 | 0.30 | 9.00 |
| B/P Value (times) | 0.50 | 0.50 | 0.50 | 0.50 | 0.50 | 0.50 | 0.50 | 0.50 | 0.10 | 3.00 |
| Content C (%) of Compound C | 0.00 | 0.00 | 0.00 | 0.00 | 0.20 | 0.00 | 0.00 | 0.00 | 0.00 | 0.00 |
| C/P Value (times) | 0.00 | 0.00 | 0.00 | 0.00 | 0.07 | 0.00 | 0.00 | 0.00 | 0.00 | 0.00 |

| | Ink | | | | | | | | | |
|---|---|---|---|---|---|---|---|---|---|---|
| | B-11 | B-12 | B-13 | B-14 | B-15 | B-16 | B-17 | B-18 | B-19 | B-20 |
| Pigment Dispersion Liquid No. | 1 | 5 | 5 | 1 | 1 | 1 | 1 | 1 | 1 | 1 |
| Kind of Compound B | B-2 | B-2 | B-2 | B-5 | B-6 | B-7 | B-8 | B-9 | B-2 | B-8 |
| Pigment Dispersion Liquid | 20.00 | 20.00 | 20.00 | 20.00 | 20.00 | 20.00 | 20.00 | 20.00 | 20.00 | 20.00 |
| Compound B | 10.00 | 1.50 | 10.00 | 0.30 | 1.50 | 1.50 | 1.50 | 0.30 | 0.20 | 1.80 |
| Compound A-15 | | | | | | | | | | 10.00 |
| Compound C-2 | | | | | | | | | | |
| Compound C-9 | | | | | | | | | | 6.00 |
| Glycerin | 10.00 | 10.00 | 10.00 | 10.00 | 10.00 | 10.00 | 10.00 | 10.00 | 10.00 | |
| Trimethylol propane | 5.00 | 13.50 | 5.00 | 14.70 | 13.50 | 13.50 | 13.50 | 14.70 | 14.80 | 7.20 |
| Acetylenol E60 | 0.50 | 0.50 | 0.50 | 0.50 | 0.50 | 0.50 | 0.50 | 0.50 | 0.50 | 0.50 |
| Ion Exchange Water | 54.50 | 54.50 | 54.50 | 54.50 | 54.50 | 54.50 | 54.50 | 54.50 | 54.50 | 54.50 |
| Content P (%) of Pigment | 3.00 | 3.00 | 3.00 | 3.00 | 3.00 | 3.00 | 3.00 | 3.00 | 3.00 | 3.00 |
| Content A (%) of Compound A | 0.00 | 0.00 | 0.00 | 0.00 | 0.00 | 0.00 | 0.00 | 0.00 | 0.00 | 10.00 |
| A/P Value (times) | 0.00 | 0.00 | 0.00 | 0.00 | 0.00 | 0.00 | 0.00 | 0.00 | 0.00 | 3.33 |
| Content B (%) of Compound B | 10.00 | 1.50 | 10.00 | 0.30 | 1.50 | 1.50 | 1.50 | 0.30 | 0.20 | 1.80 |
| B/P Value (times) | 3.33 | 0.50 | 3.33 | 0.10 | 0.50 | 0.50 | 0.50 | 0.10 | 0.07 | 0.60 |
| Content C (%) of Compound C | 0.00 | 0.00 | 0.00 | 0.00 | 0.00 | 0.00 | 0.00 | 0.00 | 0.00 | 6.00 |
| C/P Value (times) | 0.00 | 0.00 | 0.00 | 0.00 | 0.00 | 0.00 | 0.00 | 0.00 | 0.00 | 2.00 |

TABLE 6

Composition and Properties of Ink C

| | Ink | | | | | | | | | | | | | | | |
|---|---|---|---|---|---|---|---|---|---|---|---|---|---|---|---|---|
| | C-1 | C-2 | C-3 | C-4 | C-5 | C-6 | C-7 | C-8 | C-9 | C-10 | C-11 | C-12 | C-13 | C-14 | C-15 | C-16 |
| Pigment Dispersion Liquid No. | 5 | 5 | 5 | 5 | 5 | 5 | 5 | 5 | 5 | 5 | 5 | 5 | 4 | 4 | 5 | 5 |
| Kind of Compound C | C-1 | C-1 | C-2 | C-3 | C-4 | C-5 | C-6 | C-7 | C-1 | C-1 | C-1 | C-1 | C-1 | C-6 | C-8 | C-9 |
| Pigment Dispersion Liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Compound C | 0.20 | 0.20 | 0.20 | 0.20 | 0.20 | 0.20 | 0.20 | 0.20 | 0.03 | 0.06 | 1.50 | 1.60 | 0.20 | 1.60 | 0.20 | 0.20 |
| Compound A-3 | | 1.50 | | | | | | | | | | | | | | |
| Glycerin | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Trimethylol propane | 14.80 | 13.30 | 14.80 | 14.80 | 14.80 | 14.80 | 14.80 | 14.80 | 14.97 | 14.94 | 13.50 | 13.40 | 14.80 | 13.40 | 14.80 | 14.80 |
| Acetylenol E60 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Ion Exchange Water | 54.50 | 54.50 | 54.50 | 54.50 | 54.50 | 54.50 | 54.50 | 54.50 | 54.50 | 54.50 | 54.50 | 54.50 | 54.50 | 54.50 | 54.50 | 54.50 |
| Content P (%) of Pigment | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Content A (%) of Compound A | 0.00 | 1.50 | 0.00 | 0.00 | 0.00 | 0.00 | 0.00 | 0.00 | 0.00 | 0.00 | 0.00 | 0.00 | 0.00 | 0.00 | 0.00 | 0.00 |
| A/P Value (times) | 0.00 | 0.50 | 0.00 | 0.00 | 0.00 | 0.00 | 0.00 | 0.00 | 0.00 | 0.00 | 0.00 | 0.00 | 0.00 | 0.00 | 0.00 | 0.00 |
| Content B (%) of Compound B | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| B/P Value (times) | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Content C (%) of Compound C | 0.20 | 0.20 | 0.20 | 0.20 | 0.20 | 0.20 | 0.20 | 0.20 | 0.03 | 0.06 | 1.50 | 1.60 | 0.20 | 1.60 | 0.20 | 0.20 |
| C/P Value (times) | 0.07 | 0.07 | 0.07 | 0.07 | 0.07 | 0.07 | 0.07 | 0.07 | 0.01 | 0.02 | 0.50 | 0.53 | 0.07 | 0.53 | 0.07 | 0.07 |

<Evaluation>

An ink storage portion (not illustrated) of an ink jet recording apparatus having main portions illustrated in FIG. 5 was filled with each of the inks, and the following evaluations were performed in an environment at a temperature of 25° C. and a relative humidity of 10%. As a recording head, a line-type recording head having a configuration illustrated in FIG. 6 was used. This recording head includes first and second flow paths communicating between an ejection orifice and an ejection element with respect to one nozzle, and flows ink in the first flow path to the second flow path using a pump. The number of nozzles per one row of the nozzles is 1024, a nozzle density is 600 dpi, and an ejection amount of the ink per nozzle is 5 ng. In the following evaluation, a recording medium was conveyed at a speed of 15 inches/sec and an image was recorded under the conditions at which two rows of nozzle rows were used and three droplets of the ink were applied to a unit area (1/600 inches×1/600 inches). Further, a temperature of the ink in the recording head was increased to 40° C.

In the present invention, as a sum (total score) of scores of "image unevenness" and "color developability", "7 points", "6 points", "5 points" and "4 points" were set as acceptable levels, and "3 points", "2 points" and "1 point" were set as unacceptable levels. Evaluation results are illustrated in Table 7. In Comparative Examples 1, 8 and 16, it was attempted to perform evaluation under the conditions at which the ink did not flow, but it was impossible to normally eject the ink.

(Image Unevenness)

First, after the ink was flowed for 1 hour at a flow rate 10 mm/s using the ink jet recording apparatus, an image with a recording duty of 100% was recorded. As a recording medium, plain paper (trade name: "Bright White Inkjet Paper", manufactured by Hewlett-Packard) was used. Next, after the flow rate of the ink was decreased by 1 mm/s (that is, the flow rate became 9 mm/s) and this state was maintained for 1 hour, a solid image with a recording duty of 100% was recorded. Thereafter, this cycle was repeated while decreasing the flow rate of the ink by 1 mm/s at a time. An optical density of the solid image after 1 day of the recording was measured under the conditions of a light source: D50 and a field of view of 2°. An optical density of a solid image recorded with ink containing carbon black was measured using a reflection densitometer (trade name "Macbeth RD-918", manufactured by Macbeth Co.). An optical density of a solid image recorded with ink containing a color pigment was measured using a spectrophotometer (trade name "Spectrolino", manufactured by Gretag Macbeth). Based on the optical density of the solid image recorded when ink was flowed at a flow rate of 10 mm/s, image unevenness was evaluated according to the following evaluation criteria. When the optical density was changed by 0.05 or more as compared with the solid image recorded when the ink was flowed at a flow rate of 10 mm/s, it was evaluated that "a density difference occurred in the solid image". A decrease in density of a solid image recorded by decreasing the flow rate of the ink means that the ink in the vicinity of the ejection orifice was evaporated and thickened and thus, an ejection volume of the ink was decreased. In the present evaluation, the solid image was recorded after maintaining the state in which the flow rate of the ink was decreased for 1 hour in order to make the conditions in which evaporation and thickening of the ink in the vicinity of the ejection orifice easily occur.

5 points: A density difference occurred in the solid image recorded when the ink flow rate was 4 mm/s.
4 points: A density difference occurred in the solid image recorded when the ink flow rate was 5 mm/s.
3 points: A density difference occurred in the solid image recorded when the ink flow rate was 6 mm/s.
2 points: A density difference occurred in the solid image recorded when the ink flow rate was 7 mm/s.
1 point: A density difference occurred in the solid image recorded when the ink flow rate was 8 mm/s.
0 points: Unevenness occurred in the solid image recorded when the ink flow rate was 10 mm/s.

(Color Developability)

An image was recorded on two kinds of recording media (plain paper) while ink was flowed at a flow rate of 10 mm/s using the ink jet recording apparatus. As the recording media, a trade name "BUSINESS MULTIPURPOSE 4200" (manufactured by Xerox Corporation) and a trade name "Bright White Inkjet Paper" (manufactured by Hewlett-Packard) were used. In the case of ink containing carbon black, a solid image with a recording duty of 100% was recorded. In the case of ink containing a color pigment, a solid image with a recording duty of 67% was recorded. An optical density of the solid image after 1 day of the recording was measured under the conditions of a light source: D50 and a field of view of 2°. An optical density of a solid image recorded with the ink containing carbon black was measured using a reflection densitometer (trade name "Macbeth RD-918", manufactured by Macbeth Co.). An optical density of a solid image recorded with the ink containing a color pigment was measured using a spectrophotometer (trade name "Spectrolino", manufactured by Gretag Macbeth). An average value of the measured optical densities was calculated, and the color developability was evaluated according to the following evaluation criteria.

2 points: In the case of black ink, the average value of the optical densities was 1.3 or more, in the cases of cyan ink and yellow ink, the average value was 1.0 or more, and in the case of magenta ink, the average value was 0.9 or more.
1 point: In the case of black ink, the average value of the optical densities was less than 1.3, in the cases of cyan ink and yellow ink, the average value was less than 1.0, and in the case of magenta ink, the average value was less than 0.9.

TABLE 7

Evaluation Result

| | | Kind of Ink | Flow of Ink | Image Unevenness | Color Developability | Total Score |
|---|---|---|---|---|---|---|
| Example | 1 | A-1 | Presence | 5 | 2 | 7 |
| | 2 | A-2 | Presence | 5 | 2 | 7 |
| | 3 | A-3 | Presence | 5 | 2 | 7 |
| | 4 | A-4 | Presence | 5 | 2 | 7 |
| | 5 | A-5 | Presence | 5 | 2 | 7 |
| | 6 | A-6 | Presence | 4 | 2 | 6 |
| | 7 | A-7 | Presence | 5 | 2 | 7 |
| | 8 | A-8 | Presence | 5 | 2 | 7 |
| | 9 | A-9 | Presence | 4 | 2 | 6 |
| | 10 | A-10 | Presence | 4 | 2 | 6 |
| | 11 | A-11 | Presence | 4 | 2 | 6 |
| | 12 | A-12 | Presence | 4 | 2 | 6 |
| | 13 | A-13 | Presence | 4 | 2 | 6 |
| | 14 | A-14 | Presence | 4 | 2 | 6 |
| | 15 | A-15 | Presence | 4 | 2 | 6 |
| | 16 | A-16 | Presence | 5 | 2 | 7 |
| | 17 | A-17 | Presence | 5 | 2 | 7 |
| | 18 | A-18 | Presence | 4 | 2 | 6 |
| | 19 | A-19 | Presence | 4 | 2 | 6 |
| | 20 | A-20 | Presence | 2 | 2 | 4 |
| | 21 | B-1 | Presence | 4 | 2 | 6 |
| | 22 | B-2 | Presence | 4 | 2 | 6 |
| | 23 | B-3 | Presence | 4 | 2 | 6 |
| | 24 | B-4 | Presence | 4 | 2 | 6 |
| | 25 | B-5 | Presence | 5 | 2 | 7 |
| | 26 | B-6 | Presence | 4 | 2 | 6 |
| | 27 | B-7 | Presence | 4 | 2 | 6 |
| | 28 | B-8 | Presence | 3 | 2 | 5 |
| | 29 | B-9 | Presence | 4 | 2 | 6 |
| | 30 | B-10 | Presence | 4 | 2 | 6 |
| | 31 | B-11 | Presence | 3 | 2 | 5 |
| | 32 | B-12 | Presence | 3 | 2 | 5 |
| | 33 | B-13 | Presence | 2 | 2 | 4 |
| | 34 | C-1 | Presence | 4 | 2 | 6 |
| | 35 | C-2 | Presence | 5 | 2 | 7 |
| | 36 | C-3 | Presence | 4 | 2 | 6 |

TABLE 7-continued

Evaluation Result

|  |  | Kind of Ink | Flow of Ink | Image Un-evenness | Color Develop-ability | Total Score |
|---|---|---|---|---|---|---|
|  | 37 | C-4 | Presence | 4 | 2 | 6 |
|  | 38 | C-5 | Presence | 4 | 2 | 6 |
|  | 39 | C-6 | Presence | 4 | 2 | 6 |
|  | 40 | C-7 | Presence | 3 | 2 | 5 |
|  | 41 | C-8 | Presence | 4 | 2 | 6 |
|  | 42 | C-9 | Presence | 3 | 2 | 5 |
|  | 43 | C-10 | Presence | 4 | 2 | 6 |
|  | 44 | C-11 | Presence | 4 | 2 | 6 |
|  | 45 | C-12 | Presence | 4 | 1 | 5 |
|  | 46 | C-13 | Presence | 3 | 2 | 5 |
|  | 47 | C-14 | Presence | 3 | 1 | 4 |
| Comparative Example | 1 | A-1 | Absence | 0 | 2 | 2 |
|  | 2 | A-21 | Presence | 1 | 2 | 3 |
|  | 3 | A-22 | Presence | 1 | 2 | 3 |
|  | 4 | A-23 | Presence | 1 | 2 | 3 |
|  | 5 | A-24 | Presence | 1 | 2 | 3 |
|  | 6 | A-25 | Presence | 1 | 2 | 3 |
|  | 7 | A-26 | Presence | 1 | 2 | 3 |
|  | 8 | B-1 | Absence | 0 | 2 | 2 |
|  | 9 | B-14 | Presence | 1 | 2 | 3 |
|  | 10 | B-15 | Presence | 1 | 2 | 3 |
|  | 11 | B-16 | Presence | 1 | 2 | 3 |
|  | 12 | B-17 | Presence | 1 | 2 | 3 |
|  | 13 | B-18 | Presence | 1 | 2 | 3 |
|  | 14 | B-19 | Presence | 1 | 2 | 3 |
|  | 15 | B-20 | Presence | 1 | 2 | 3 |
|  | 16 | C-1 | Absence | 0 | 2 | 2 |
|  | 17 | C-15 | Presence | 1 | 2 | 3 |
|  | 18 | C-16 | Presence | 1 | 2 | 3 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-133626, filed Jul. 7, 2017, and Japanese Patent Application No. 2018-112737, filed Jun. 13, 2018, which are hereby incorporated by reference herein in their entirety.

What is claimed is:

1. An ink jet recording method of recording an image by ejecting ink from a recording head including (i) an ejection orifice ejecting the ink, (ii) an ejection element generating energy for ejecting the ink, and (iii) first and second flow paths that communicate between the ejection orifice and the ejection element and in which the ink flows, the ink jet recording method comprising:
   an ejection step of ejecting the ink from the ejection orifice; and
   a flow step of flowing the ink in the first flow path to the second flow path separately from the ejection step,
   wherein the ink is an aqueous ink comprising a pigment and a compound having an ethylene oxide group, and
   wherein the compound having an ethylene oxide group is at least one selected from the group consisting of the following compound A, compound B, and compound C:
   compound A: polyhydric alcohol derivative in which X mole(s) of ethylene oxide group(s) and Y mole(s) of propylene oxide group(s) are added to a polyhydric alcohol having three or more hydroxy groups and a proportion of $\{X/(X+Y)\}\times100(\%)$ is 5% or more to 45% or less,
   compound B: polyethylene glycol having a number average molecular weight of 600 or more to 4,000 or less (provided, a content (% by mass) of the compound B in the ink is 0.10 times or more, as a mass ratio, with respect to a content (% by mass) of the pigment), and
   compound C: polyoxyethylene alkyl ether having a hydrocarbon group in which the number of carbon atoms is 12 or more.

2. The ink jet recording method according to claim 1, wherein the proportion of $\{X/(X+Y)\}\times100(\%)$ of the compound A is 10% or more to 30% or less.

3. The ink jet recording method according to claim 1, wherein the polyhydric alcohol of the compound A comprises sorbitol.

4. The ink jet recording method according to claim 1, wherein the compound B comprises a polyethylene glycol having a number average molecular weight of 600 or more to 2,000 or less.

5. The ink jet recording method according to claim 1, wherein an HLB value of the compound C that is obtained by a Griffin method is 12.0 or more.

6. The ink jet recording method according to claim 1, wherein a content (% by mass) of the compound A in the ink is 0.20 times or more to 3.50 times or less, as a mass ratio, with respect to the content (% by mass) of the pigment.

7. The ink jet recording method according to claim 1, wherein the content (% by mass) of the compound B in the ink is 3.00 times or less, as a mass ratio, with respect to the content (% by mass) of the pigment.

8. The ink jet recording method according to claim 1, wherein a content (% by mass) of the compound C in the ink is 0.02 times or more to 0.50 times or less, as a mass ratio, with respect to the content (% by mass) of the pigment.

9. The ink jet recording method according to claim 1, wherein the pigment comprises a resin-dispersed pigment, and
   wherein the compound having an ethylene oxide group comprises at least one of the compound A and the compound B.

10. The ink jet recording method according to claim 1, wherein the pigment comprises a self-dispersible pigment, and
    wherein the compound having an ethylene oxide group comprises the compound C.

11. The ink jet recording method according to claim 1, wherein the recording head comprises a plurality of the ejection orifices, a plurality of first flow paths, and a plurality of second flow paths,
    wherein each of the plurality of first flow paths communicates with an inlet path, and
    wherein each of the plurality of second flow paths communicates with an outlet path.

12. The ink jet recording method according to claim 1, wherein the flow step is a step of flowing the ink in the first flow path to the second flow path without discharging the ink from the ejection orifice.

13. The ink jet recording method according to claim 1, further comprising a recovery step of the recording head,
    wherein, during performing of the recovery step, the flow step is stopped.

14. The ink jet recording method according to claim 1, wherein, in the flow step, the ink flows in a direction that crosses the ink-ejecting direction.

15. The ink jet recording method according to claim 1, wherein, in the flow step, the ink flows from the first flow path to the second flow path by a flowing unit separately from the ejection element.

16. The ink jet recording method according to claim 1, wherein, in the flow step, the ink flows from the first flow path to the second flow path by a pressure difference.

17. The ink jet recording method according to claim 16, wherein a flow rate (mm/s) of the ink is 0.1 mm/s or more to 10.0 mm/s or less.

18. The ink jet recording method according to claim 1, wherein, in the flow step, the ink flows intermittently from the first flow path to the second flow path.

19. The ink jet recording method according to claim 18, wherein a flow rate (mm/s) of the ink is 1.0 mm/s or more to 10.0 mm/s or less.

20. An ink jet recording apparatus comprising:
   a recording head including (i) an ejection orifice ejecting the ink, (ii) an ejection element generating energy for ejecting the ink, and (iii) first and second flow paths that communicate between the ejection orifice and the ejection element and in which the ink flows; and
   a flowing unit flowing the ink in the first flow path to the second flow path separately from the ejection element,
   wherein the ink is an aqueous ink comprising a pigment and a compound having an ethylene oxide group, and
   wherein the compound having an ethylene oxide group is at least one selected from the group consisting of the following compound A, compound B, and compound C:
   compound A: polyhydric alcohol derivative in which X mole(s) of ethylene oxide group(s) and Y mole(s) of propylene oxide group(s) are added to a polyhydric alcohol having three or more hydroxy groups and a proportion of $\{X/(X+Y)\}\times 100(\%)$ is 5% or more to 45% or less,
   compound B: polyethylene glycol having a number average molecular weight of 600 or more to 4,000 or less (provided, a content (% by mass) of the compound B in the ink is 0.10 times or more, as a mass ratio, with respect to a content (% by mass) of the pigment), and
   compound C: polyoxyethylene alkyl ether having a hydrocarbon group in which the number of carbon atoms is 12 or more.

* * * * *